(12) United States Patent
Okutani et al.

(10) Patent No.: US 11,550,206 B2
(45) Date of Patent: *Jan. 10, 2023

(54) LIGHT RECEIVING APPARATUS WITH SHOCK RESISTANCE

(71) Applicant: NIKON CORPORATION, Tokyo (JP)

(72) Inventors: Tsuyoshi Okutani, Machida (JP); Eiji Matsukawa, Yotsukaido (JP); Yoshiaki Tanabe, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,830

(22) Filed: Feb. 6, 2019

(65) Prior Publication Data

US 2019/0174036 A1 Jun. 6, 2019

Related U.S. Application Data

(63) Continuation of application No. 14/854,808, filed on Sep. 15, 2015, now Pat. No. 10,237,457, which is a
(Continued)

(30) Foreign Application Priority Data

Mar. 15, 2013 (JP) ................................ 2013-054441

(51) Int. Cl.
*G03B 17/14* (2021.01)
*H04N 5/225* (2006.01)
(Continued)

(52) U.S. Cl.
CPC ............... *G03B 17/14* (2013.01); *G02B 7/14* (2013.01); *G03B 17/02* (2013.01); *H04N 5/2252* (2013.01); *H04N 5/2253* (2013.01)

(58) Field of Classification Search
CPC .................................................... H04N 5/2254
See application file for complete search history.

(56) References Cited

U.S. PATENT DOCUMENTS 4,017,878 A * 4/1977 Hagiwara .............. G03B 17/14
396/530
4,326,783 A * 4/1982 Kawamura ............ G03B 19/12
396/110
(Continued)

FOREIGN PATENT DOCUMENTS

CN 201203517 Y 3/2009
CN 101859049 A 10/2010
(Continued)

OTHER PUBLICATIONS

International Search Report dated Mar. 25, 2014 in corresponding international application PCT/JP2014/001157.
(Continued)

*Primary Examiner* — Cynthia Segura

(57) ABSTRACT

Provided is a light receiving apparatus including a first light receiving unit; a body to which the first light receiving unit is secured; a first exterior portion that covers at least a portion of the body; and a mount that is capable of having an interchangeable lens attached thereto, to which the body and the first exterior portion are secured. Also provided is a light receiving apparatus, in which a body to which a first light receiving unit is secured and a first exterior portion that covers at least a portion of the body are secured to a mount that is capable of having an interchangeable lens attached thereto, and force placed on the first exterior portion is absorbed by the mount, such that transfer of the force placed on the first exterior portion to the body is reduced.

8 Claims, 12 Drawing Sheets

Related U.S. Application Data continuation of application No. PCT/JP2014/001157, filed on Mar. 3, 2014.

(51) Int. Cl.
  *G03B 17/02* (2021.01)
  *G02B 7/14* (2021.01)

(56) References Cited

U.S. PATENT DOCUMENTS

| | | | |
|---|---|---|---|
| 4,419,000 A | 12/1983 | Yoshida | |
| 4,918,477 A * | 4/1990 | Matsuda | G03B 17/02 396/176 |
| 5,032,919 A * | 7/1991 | Randmae | G02B 7/10 348/345 |
| 5,212,514 A | 5/1993 | Goto | |
| 5,221,964 A * | 6/1993 | Chamberlain | H04N 5/2251 348/224.1 |
| 5,426,478 A * | 6/1995 | Katagiri | G03B 15/05 396/176 |
| 5,644,441 A * | 7/1997 | Hirasaki | G03B 17/14 359/827 |
| 5,861,654 A | 1/1999 | Johnson | |
| 6,628,339 B1 | 9/2003 | Ferland | |
| 6,678,001 B1 | 1/2004 | Elberbaum | |
| 6,979,138 B2 * | 12/2005 | Kawazura | G03B 17/14 396/531 |
| 7,250,972 B2 | 7/2007 | Oshima | |
| 7,636,521 B2 * | 12/2009 | Tanaka | G03B 17/18 396/303 |
| 7,825,983 B2 | 11/2010 | Hirooka et al. | |
| 8,002,479 B2 | 8/2011 | Ueda et al. | |
| 8,135,272 B2 | 3/2012 | Park | |
| 8,274,601 B2 * | 9/2012 | Hsieh | G03B 17/12 348/335 |
| 8,638,386 B2 * | 1/2014 | Mukai | H04N 5/2254 348/335 |
| 8,704,944 B1 * | 4/2014 | Wierzoch | H04N 5/2251 348/207.99 |
| 9,197,801 B2 | 11/2015 | Iikawa | |
| 10,440,330 B2 * | 10/2019 | Shin | H04N 5/2252 |
| 2003/0185554 A1 | 10/2003 | Nakano | |
| 2004/0047625 A1 * | 3/2004 | Ito | G03B 17/48 396/429 |
| 2004/0141738 A1 * | 7/2004 | Kawazura | G03B 17/14 396/529 |
| 2005/0162538 A1 * | 7/2005 | Kurosawa | G03B 19/12 348/335 |
| 2005/0163499 A1 | 7/2005 | Kurosawa | |
| 2005/0200743 A1 | 9/2005 | Kawai | |
| 2006/0010803 A1 * | 1/2006 | Suzuki | H05K 5/0004 52/390 |
| 2006/0056829 A1 | 3/2006 | Hirota et al. | |
| 2006/0115261 A1 | 6/2006 | Nomura | |
| 2006/0164538 A1 | 7/2006 | Kawasaki | |
| 2007/0019084 A1 | 1/2007 | Nomura | |
| 2007/0103579 A1 | 5/2007 | Niwamae | |
| 2007/0140681 A1 * | 6/2007 | Tanaka | G03B 17/14 396/279 |
| 2009/0067831 A1 | 3/2009 | Hwang | |
| 2009/0141158 A1 | 6/2009 | Moon | |
| 2009/0303379 A1 * | 12/2009 | Wada | G03B 3/04 348/373 |
| 2010/0007757 A1 | 1/2010 | Nakayama | |
| 2010/0033587 A1 | 2/2010 | Yumiki | |
| 2010/0045853 A1 * | 2/2010 | Murashima | G03B 13/06 348/369 |
| 2010/0104271 A1 | 4/2010 | Park et al. | |
| 2010/0165188 A1 | 7/2010 | Jannard | |
| 2010/0254700 A1 | 10/2010 | Ueda et al. | |
| 2010/0277604 A1 | 11/2010 | Sasaki | |
| 2011/0013077 A1 * | 1/2011 | Okada | H04N 5/2253 348/373 |
| 2011/0037893 A1 * | 2/2011 | Okada | H04N 5/2252 348/374 |
| 2011/0123189 A1 * | 5/2011 | Saito | G03B 17/02 396/535 |
| 2011/0164157 A1 * | 7/2011 | Katsuda | G02B 27/141 348/280 |
| 2011/0242408 A1 * | 10/2011 | Hsieh | G03B 17/12 348/374 |
| 2011/0298970 A1 | 12/2011 | Shinohara | |
| 2011/0317062 A1 | 12/2011 | Fujino | |
| 2012/0057860 A1 * | 3/2012 | Hasuda | G03B 17/566 396/531 |
| 2012/0082441 A1 * | 4/2012 | Krueger | G01C 11/02 396/7 |
| 2012/0274841 A1 | 11/2012 | Iyoda | |
| 2012/0314118 A1 | 12/2012 | Tobinaga | |
| 2013/0028590 A1 | 1/2013 | Hasuda | |
| 2013/0077956 A1 * | 3/2013 | Imafuji | G03B 17/56 396/532 |
| 2013/0077957 A1 * | 3/2013 | Oikawa | G03B 17/56 396/532 |
| 2013/0128105 A1 * | 5/2013 | Nunnink | G02B 7/022 348/374 |
| 2014/0078350 A1 | 3/2014 | Aoki | |
| 2014/0111686 A1 | 4/2014 | Iikawa | |
| 2014/0119721 A1 | 5/2014 | Iikawa | |
| 2014/0300796 A1 | 10/2014 | Sakishita | |
| 2015/0037023 A1 | 2/2015 | Sanada | |
| 2015/0156380 A1 | 6/2015 | Volfson | |
| 2015/0236564 A1 | 8/2015 | Sanada | |
| 2016/0154197 A1 | 6/2016 | Shishido | |
| 2016/0349601 A1 | 12/2016 | Kungl | |
| 2017/0351165 A1 * | 12/2017 | Asai | H04N 5/2252 |

FOREIGN PATENT DOCUMENTS

| | | |
|---|---|---|
| CN | 102346287 A | 2/2012 |
| JP | 2-99830 | 4/1990 |
| JP | 2-230132 | 9/1990 |
| JP | 5-4115 | 1/1993 |
| JP | 9-61930 | 3/1997 |
| JP | 9-230548 | 9/1997 |
| JP | 11-70013 | 3/1999 |
| JP | 11-174562 | 7/1999 |
| JP | 2004-100868 | 4/2004 |
| JP | 2004-104168 | 4/2004 |
| JP | 2005-215014 | 8/2005 |
| JP | 2005-322717 | 11/2005 |
| JP | 2006-78891 | 3/2006 |
| JP | 2006-78898 | 3/2006 |
| JP | 2006-133562 | 5/2006 |
| JP | 2006-251058 | 9/2006 |
| JP | 2008-20837 | 1/2008 |
| JP | 2009-145580 | 7/2009 |
| JP | 2009-152879 | 7/2009 |
| JP | 2009-175311 | 8/2009 |
| JP | 2009-211895 | 9/2009 |
| JP | 2010-102340 | 5/2010 |
| JP | 2010-114641 | 5/2010 |
| JP | 2010-243634 | 10/2010 |
| JP | 2011-10069 | 1/2011 |
| JP | 4738946 | 8/2011 |
| JP | 2012-37620 | 2/2012 |
| JP | 2012-168338 | 9/2012 |
| JP | WO2012173051 | 12/2012 |
| JP | 2014-44310 | 3/2014 |
| TW | 201134201 A1 | 10/2011 |

OTHER PUBLICATIONS

International Preliminary Report on Patentability and Written Opinion dated Sep. 24, 2015 in corresponding International Patent Application No. PCT/JP2014/001157.
Chinese Office Action dated Jul. 18, 2017 in corresponding Chinese Patent Application No. 201480026511.9.
Office Action dated Jun. 28, 2018 in corresponding Chinese Patent Application No. 201480026511.9, 20 pgs.

(56) References Cited

OTHER PUBLICATIONS

Notification of Reasons for Refusal dated Feb. 27, 2018 in corresponding Japanese Patent Application No. 2015-505266, 6 pgs.
Office Action dated Jan. 31, 2018 in corresponding Chinese Patent Application No. 201480026511.9, 21 pgs.
U.S. Notice of Allowance dated Novembers, 2018 in U.S. Appl. No. 14/854,808.
U.S. Office Action dated Jul. 31, 2018 in U.S. Appl. No. 14/854,808.
U.S. Office Action dated Dec. 7, 2017 in U.S. Appl. No. 14/854,808.
U.S. Office Action dated Jun. 14, 2017 in U.S. Appl. No. 14/854,808.
U.S. Appl. No. 14/854,808, filed Sep. 15, 2015, Tsuyoshi Okutani, Nikon Corporation.
Chinese Office Action dated Mar. 5, 2019 in Chinese Patent Application No. 201480026511.9.
Chinese Office Action dated Jul. 12, 2019 in Chinese Patent Application No. 201480026511.9.
Chinese Office Action dated Nov. 26, 2019 in Chinese Patent Application No. 201480026511.9.
Japanese Office Action dated Oct. 29, 2019 in Japanese Patent Application No. 2018-246825.
Japanese Office Action dated Nov. 10, 2020 in Japanese Patent Application No. 2018-246825.
Office Action, dated Apr. 2, 2021, in corresponding Chinese Application No. 202010518356.X (16 pp.).
Notice of Reasons for Refusal, dated Feb. 22, 2022, in Japanese Patent Application No. 2021-017810 (7 pp.).
Office Action, dated Jul. 12, 2022, in counterpart Japanese Patent Application No. 2021-017810 (5 pp.).

\* cited by examiner

LIGHT RECEIVING APPARATUS WITH SHOCK RESISTANCE

This application is a continuation application of U.S. patent application Ser. No. 14/854,808, filed Sep. 15, 2015, which is a continuation application, filed under 35 U.S.C. § 111(a), of International Application PCT/JP2014/001157, filed Mar. 3, 2014, which claims the priority benefit of Japanese Patent Application 2013-054441, filed Mar. 15, 2013, the disclosures of which are hereby incorporated by reference in their entirety.

BACKGROUND

1. Technical Field

The present invention relates to a light receiving apparatus.

2. Related Art

A camera is known in which a mirror box supporting an imaging element is supported on a main frame that is the main structure of the camera body by a shock resistant support member.
Patent Document 1: Japanese Patent Application Publication No. 2005-215014

However, there is a problem that components to which the optical elements are secured are prone to receiving stress from the outside.

SUMMARY

According to a first aspect of the present invention, provided is a light receiving apparatus comprising a first light receiving unit; a body to which the first light receiving unit is secured; a first exterior portion that covers at least a portion of the body; and a mount that is capable of having an interchangeable lens attached thereto, to which the body and the first exterior portion are secured.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
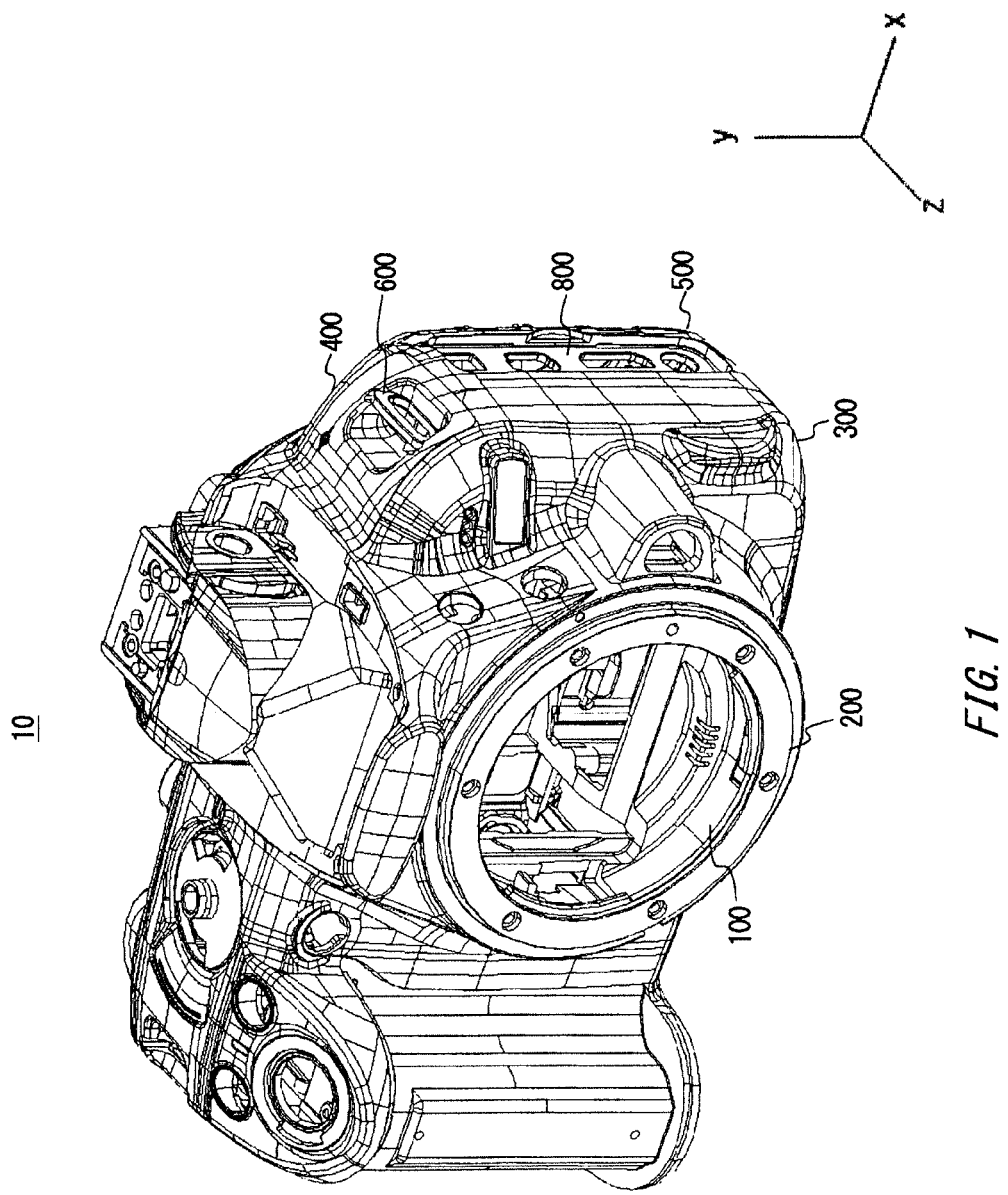
FIG. 1 is a perspective view schematically showing the outer appearance of an imaging device 10.

FIG. 1 is a perspective view schematically showing the outer appearance of an imaging device 10. FIG. 1 mainly shows the structural components of the imaging device 10. The imaging device 10 is a camera body of a single-lens reflex camera. The imaging device 10 includes a body 100, a body-side mount 200, a front cover 300, a top cover 400, a back cover 500, a suspension ring 600, and a substrate cover 800.

As described further below, an imaging unit is secured to the body 100. The body-side mount 200 has an interchangeable lens attached thereto. When describing the configuration of the imaging device 10, the direction along the optical axis of the interchangeable lens apparatus is defined as the z axis direction. In other words, the direction of an incident subject light beam is defined as the z axis direction. The direction in which the subject light beam is incident is defined as the negative z axis direction, and the opposite of this direction is defined as the positive z axis direction. Furthermore, the directions shown in FIG. 1 are defined as the x axis direction and the y axis direction. The x axis, the y axis, and the z axis form an orthogonal right-handed coordinate system. There may be cases where the positive z axis direction is referred to as "forward" or "toward the front." Furthermore, there may be cases where the negative z axis direction is referred to as "backward" or "toward the back." There may be cases where the positive y axis direction is referred to as "upward" or "toward the top." There may be cases where the negative y axis direction is referred to as "downward" or "toward the bottom."

Figure 2:
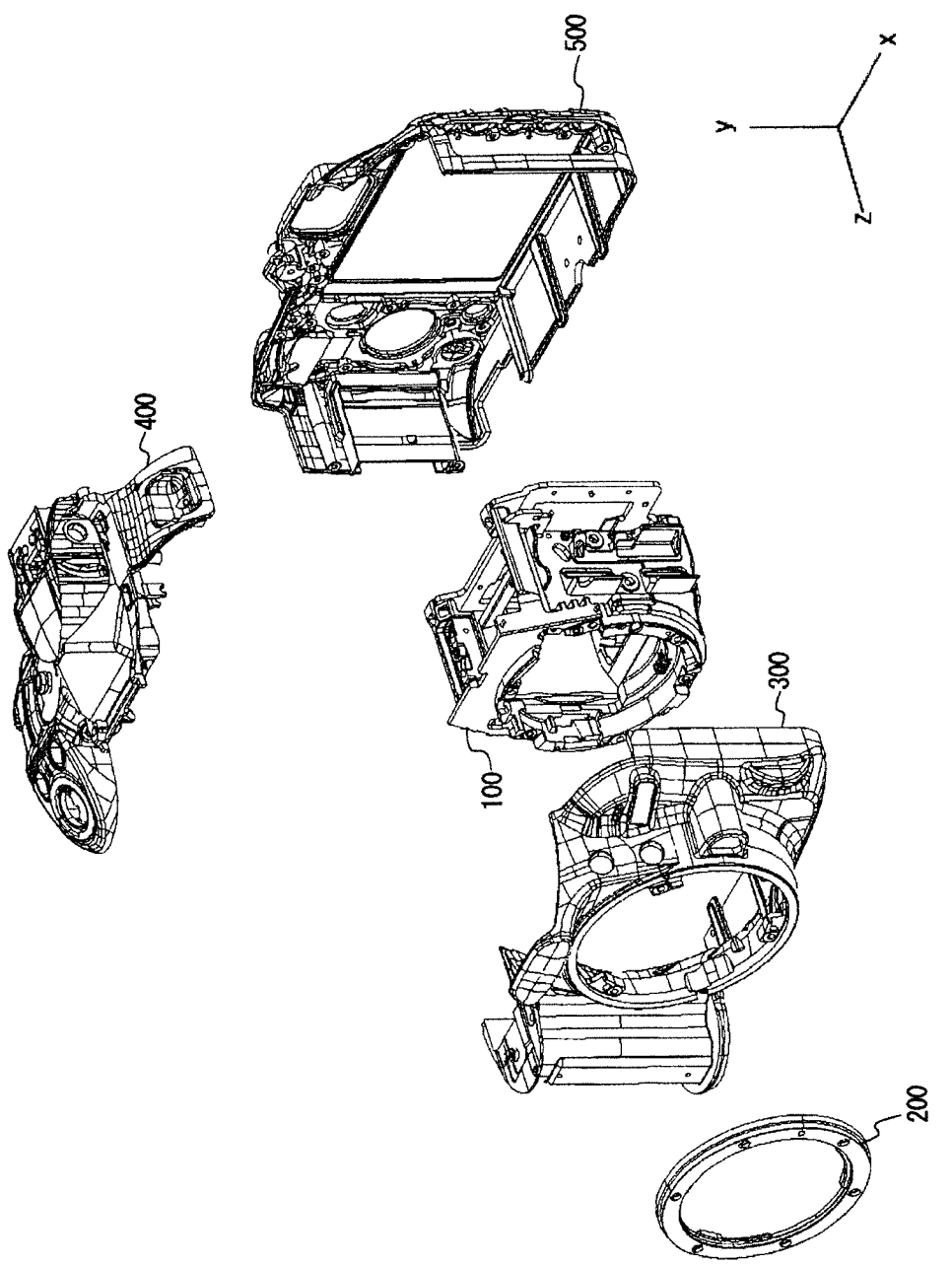
FIG. 2 is an exploded perspective view schematically showing the assembly of the imaging device 10.

FIG. 2 is an exploded perspective view schematically showing the assembly of the imaging device 10. FIG. 2 schematically shows the assembly of the body 100, the body-side mount 200, the front cover 300, the top cover 400, and the back cover 500.

The following is a basic description of the structure of the imaging device 10. The front cover 300 covers at least a portion of the body 100. The body 100 is substantially covered by the front cover 300, the top cover 400, and the back cover 500. The front cover 300, the top cover 400, and the back cover 500 are formed of resin. The front cover 300, the top cover 400, and the back cover 500 are formed by resin molding. The body-side mount 200 is formed of metal. The body-side mount 200 is a mount ring shaped as a ring. The body 100 is formed of resin.

As described further below, the body-side mount 200 is secured to the body 100, along with the front cover 300, for example. By securing the body-side mount 200 to the front cover 300, the stiffness of the position on the front cover 300 where the body-side mount 200 is secured is increased. Accordingly, the front cover 300 is secured at a position on the body 100 that has high stiffness. The body 100 is not secured to any of the front cover 300, the top cover 400, and the back cover 500 at any other location. The front cover 300, the top cover 400, and the back cover 500 have a monocoque structure. The front cover 300, the top cover 400, and the back cover 500 are connected to each other by a spigot structure at contact surfaces. Accordingly, the stress placed on any one of the front cover 300, the top cover 400, and the back cover 500 can be received by the entire structure including the front cover 300, the top cover 400, and the back cover 500, and the stress is transferred in a manner to be focused on the portion of the body 100 having increased stiffness due to the securing of the body-side mount 200. Therefore, the effect that the stress placed on any one of the front cover 300, the top cover 400, and the back cover 500 has on the positioning accuracy of the imaging unit secured to the body 100 can be reduced.

Figure 3:
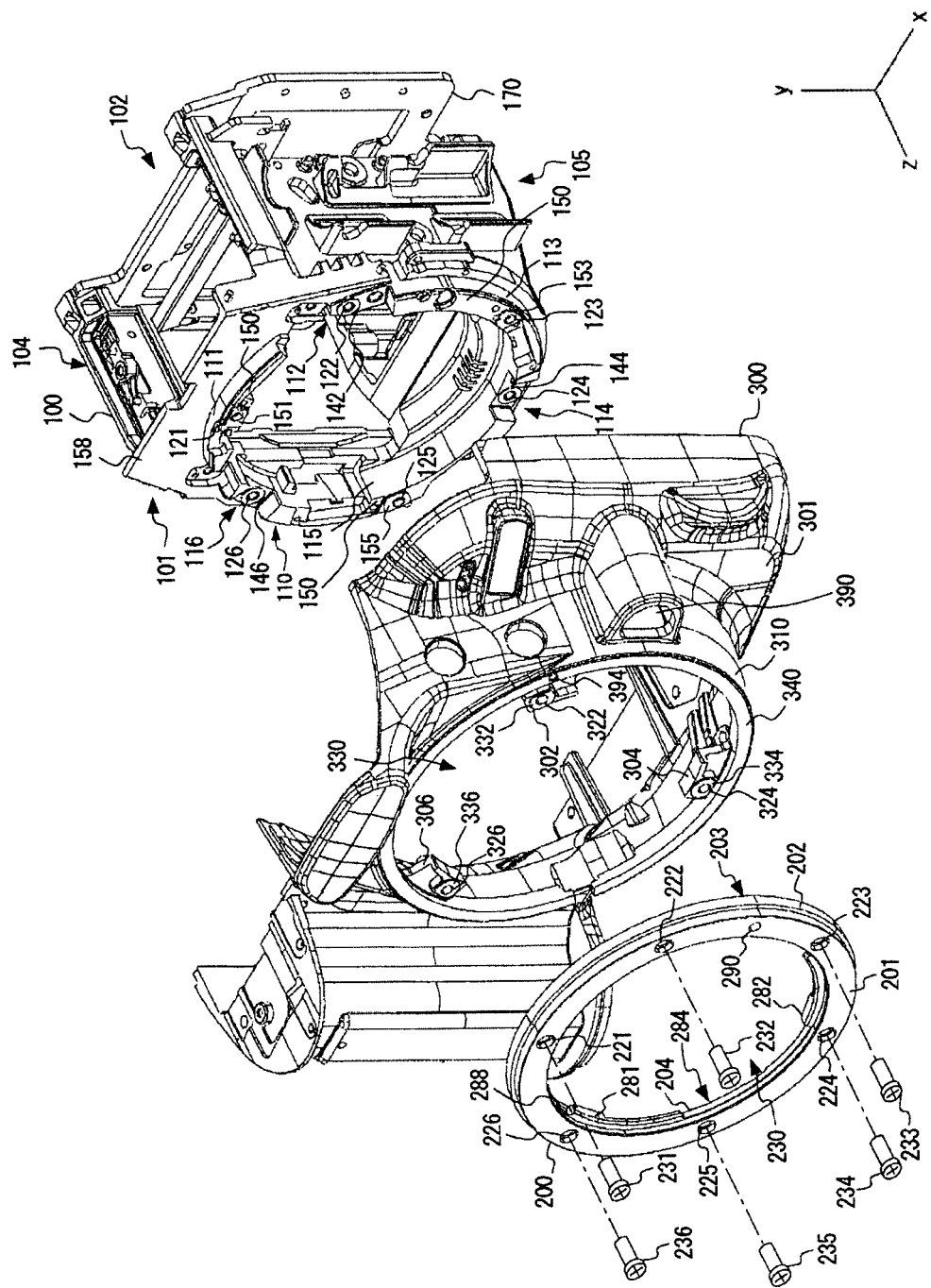
FIG. 3 is an exploded perspective view schematically showing the assembly of the body 100, the body-side mount 200, and the front cover 300.

FIG. 3 is an exploded perspective view schematically showing the assembly of the body 100, the body-side mount 200, and the front cover 300.

The body 100 has an overall box shape. The body 100 includes a front surface 101 and a back surface 102 that is on the opposite side of the front surface 101. The back surface 102 is positioned farther in the negative z axis direction than the front surface 101.

An imaging unit 160, which is described further below, is secured to the back surface 102 of the body 100. Specifically, a bracket 170 is secured to the back surface 102 of the body 100. For example, the bracket 170 is fastened to the body 100 on the back surface 102. The imaging unit 160 described further below is secured to the bracket 170. In addition to the imaging unit 160, a mirror unit, a shutter unit, a finder unit, a focal point detection unit, and the like are secured to the body 100. The finder unit is secured to the top surface 104 of the body 100. The focal point detection unit is secured to the bottom surface 105, which is a surface of the body 100 on the side opposite the top surface 104. A power supply unit 840 that is described further below and various manipulation components are attached to the front cover 300.

The body 100 includes a securing section 110 to which the body-side mount 200 is secured. The securing section 110 protrudes in the positive z axis direction beyond the front surface 101. The securing section 110 has a first surface 150 that protrudes in the positive z axis direction beyond a second surface 158 of the front surface 101, which is parallel to the xy plane. The securing section 110 has a substantially circular shape in the xy plane. The securing section 110 has a substantially cylindrical shape.

A recessed portion 112, a recessed portion 114, and a recessed portion 116 are formed in the first surface 150 of the securing section 110. The recessed portion 112 has a floor portion 142. The recessed portion 114 has a floor portion 144. The recessed portion 116 has a floor portion 146. The first surface 150 is positioned farther in the positive z axis direction than the floor portion 142, the floor portion 144, and the floor portion 146.

A convex portion 113 is formed between the recessed portion 112 and the recessed portion 114 in the securing section 110. A convex portion 115 is formed between the recessed portion 114 and the recessed portion 116. A convex portion 111 is formed between the recessed portion 116 and the recessed portion 112. The first surface 150 forms a top surface 151 of the convex portion 111, a top surface 153 of the convex portion 113, and a top surface 155 of the convex portion 115.

A hole 121 is formed on the top surface 151 of the convex portion 111. A hole 123 is formed on the top surface 153 of the convex portion 143. A hole 125 is formed on the top surface 155 of the convex portion 145. A screw 231 is inserted through the hole 121. A screw 233 is inserted through the hole 123. A screw 235 is inserted through the hole 125.

A hole 122 is formed in the floor portion 142. A hole 124 is formed in the floor portion 144. A hole 126 is formed in the floor portion 146. A screw 232 is inserted through the hole 122. A screw 234 is inserted through the hole 124. A screw 236 is inserted through the hole 126.

The body-side mount 200 has a mounting surface 201 that is the surface on which the interchangeable lens is attached, a mount securing surface 203 that is the surface on the opposite side from the mounting surface 201, a side surface 202 that is the surface between the mounting surface 201 and the mount securing surface 203, and a side surface 204 that is the surface on the opposite side from the side surface 202.

A hole 221, a hole 222, a hole 223, a hole 224, a hole 225, and a hole 226 are formed in the body-side mount 200. The hole 221, the hole 222, the hole 223, the hole 224, the hole 225, and the hole 226 penetrate from the lens mounting surface 201 to the mount securing surface 203. The hole 221, the hole 222, the hole 223, the hole 224, the hole 225, and the hole 226 are through-holes that penetrate from the lens mounting surface 201 to the mount securing surface 203 in the z axis direction.

The front cover 300 has a front surface 301, a side portion 310 that protrudes in the positive z axis direction from the front surface 301 and surrounds the securing section 110, and a flat surface portion 340 that is parallel to the xy plane following the side portion 310. The flat surface portion 340 has an opening 330. The opening 330 is substantially circular in the xy plane. The diameter of the opening 330 is larger than the outer diameter of the securing section 110 in the xy plane.

The front cover 300 has a front cover-side fastening portion 302 that protrudes from the side portion 310 toward the inside of the opening 330. The front cover 300 has a front cover-side fastening portion 304 that protrudes from the side portion 310 toward the inside of the opening 330. The front cover 300 has a front cover-side fastening portion 306 that protrudes from the side portion 310 toward the inside of the opening 330. A hole 322 is formed in the front cover-side fastening portion 302. A hole 324 is formed in the front cover-side fastening portion 304. A hole 326 is formed in the front cover-side fastening portion 306. The hole 322 is a through-hole. The hole 324 is a through-hole. The hole 326 is a through-hole. The screw 232 is inserted through the hole 322. The screw 234 is inserted through the hole 324. The screw 236 is inserted through the hole 326. When assembling the body-side mount 200, the front cover 300, and the body 100, the screw 232 is inserted through the hole 322, the screw 234 is inserted through the hole 324, and the screw 236 is inserted through the hole 326.

The front cover-side fastening portion 302 is housed in the recessed portion 112. The front cover-side fastening portion 304 is housed in the recessed portion 114. The front cover-side fastening portion 306 is housed in the recessed portion 116. The surface 332 of the front cover-side fastening portion 302 is a surface that is on the opposite side from the surface facing the floor portion 142 of the recessed portion 112, when the front cover-side fastening portion 302 is being housed in the recessed portion 112. The surface 334 of the front cover-side fastening portion 304 is a surface that is on the opposite side from the surface facing the floor portion 144 of the recessed portion 114, when the front cover-side fastening portion 304 is being housed in the recessed portion 114. The surface 336 of the front cover-side fastening portion 306 is a surface that is on the opposite side from the surface facing the floor portion 146 of the recessed portion 116, when the front cover-side fastening portion 306 is being housed in the recessed portion 116. A hole 322 is formed in the surface 332 of the front cover-side fastening portion 302. A hole 324 is formed in the surface 334 of the front cover-side fastening portion 304. A hole 326 is formed in the surface 336 of the front cover-side fastening portion 306.

In a state where the front cover-side fastening portion 302 is housed in the recessed portion 112, the front cover-side fastening portion 304 is housed in the recessed portion 114, and the front cover-side fastening portion 306 is housed in the recessed portion 116, the first surface 150, the surface 332, the surface 334, and the surface 336 form a flat surface. Specifically, the top surface 151 of the convex portion 111 of the body 100, the top surface 153 of the convex portion 113 of the body 100, the top surface 155 of the convex portion 115 of the body 100, the surface 332 of the front cover-side fastening portion 302, the surface 334 of the front cover-side fastening portion 304, and the surface 336 of the front cover-side fastening portion 306 form a flat surface that is parallel to the xy plane. In other words, the flat surface including the top surface 151, the top surface 153, the top surface 155, the surface 332, the surface 334, and the surface 336 is parallel to the xy plane. In a state where the body-side mount 200 is in contact with the flat surface formed by the first surface 150, the surface 332, the surface 334, and the surface 336, the front cover 300 and the body 100 are fastened thereto by the screw 232, the screw 234, and the screw 236. Specifically, in a state where the mount securing surface 203 of the body-side mount 200 is in contact with the flat surface formed by the first surface 150, the surface 332, the surface 334, and the surface 336, the body-side mount 200, the front cover 300, and the body 100 are fastened together.

In a state where the front cover-side fastening portion 302 is housed in the recessed portion 112, the front cover-side fastening portion 304 is housed in the recessed portion 114, and the front cover-side fastening portion 306 is housed in the recessed portion 116, the hole 322 is positionally fixed at the position of the hole 122 in the xy plane, the hole 324 is positionally fixed at the position of the hole 124 in the xy plane, and the hole 326 is positionally fixed at the position of the hole 126 in the xy plane. The state where the front cover-side fastening portion 302 is housed in the recessed portion 112, the front cover-side fastening portion 304 is housed in the recessed portion 114, and the front cover-side fastening portion 306 is housed in the recessed portion 116 may be referred to as a state in which the front cover 300 is positionally fixed relative to the body 100.

In the body-side mount 200, the hole 221 is positioned at a position corresponding to the hole 121. The hole 222 is positioned at a position corresponding to the hole 122. The hole 223 is positioned at a position corresponding to the hole 123. The hole 224 is positioned at a position corresponding to the hole 124. The hole 225 is positioned at a position corresponding to the hole 125. The hole 226 is positioned at a position corresponding to the hole 126.

For example, when the body-side mount 200 and the body 100 are positionally fixed such that the hole 221 is positionally fixed at the position of the hole 121 in the xy plane and the hole 224 is positionally fixed at the position of the hole 124 in the xy plane, the hole 222 is positionally fixed at the position of the hole 122 in the xy plane, the hole 223 is positionally fixed at the position of the hole 123 in the xy plane, the hole 225 is positionally fixed at the position of the hole 125 in the xy plane, and the hole 226 is positionally fixed at the position of the hole 126 in the xy plane. The state where the hole 221, the hole 222, the hole 223, the hole 224, the hole 225, and the hole 226 of the body-side mount 200 are respectively positionally fixed at the positions of the hole 121, the hole 122, the hole 123, the hole 124, the hole 125, and the hole 126 may be referred to as a state in which the body-side mount 200 is positionally fixed relative to the body 100.

In a state where the front cover 300 is positionally fixed relative to the body 100 and the body-side mount 200 is positionally fixed relative to the body 100, the screw 231 is inserted through the hole 221 and the hole 121, the screw 233 is inserted through the hole 223 and the hole 123, the screw 235 is inserted through the hole 225 and the hole 125, and the body-side mount 200 and body 100 are attached directly to each other by the screw 231, the screw 233, and the screw 235.

Furthermore, in the state where the front cover 300 is positionally fixed relative to the body 100 and the body-side mount 200 is positionally fixed relative to the body 100, the screw 232 is inserted through the hole 222, the hole 322, and the hole 122, the screw 234 is inserted through the hole 224, the hole 324, and the hole 124, the screw 236 is inserted through the hole 226, the hole 326, and the hole 126, and body-side mount 200, the front cover 300, and the body 100 are fastened by the screw 232, the screw 234, and the screw 236. In a state where the front cover-side fastening portion 302, the front cover-side fastening portion 304, and the front cover-side fastening portion 306 are sandwiched by the body-side mount 200 and the body 100 in the z axis direction in this manner, the body-side mount 200 and the body 100 are fastened together by the screw 232, the screw 234, and the screw 236. In the state where the front cover 300 is sandwiched by the body-side mount 200 and the body 100 in a prescribed direction in this manner, the body-side mount 200 and the body 100 are fastened together by the screws. Accordingly, the front cover 300 is secured in a state of being sandwiched by the body-side mount 200 and the body 100 in the prescribed direction.

In the xy plane, the hole 221, the hole 222, the hole 223, the hole 224, the hole 225, and the hole 226 are positioned in the same circle. Specifically, in the xy plane, the hole 221, the hole 222, the hole 223, the hole 224, the hole 225, and the hole 226 are formed at positions every 60 degrees around the optical axis. The hole 221, the hole 223, and the hole 225 are positioned at the vertices of an equilateral triangle. The hole 222, the hole 224, and the hole 226 are positioned at the vertices of an equilateral triangle.

In this way, the body-side mount 200 is fastened in its entirety to the body 100 at six points in the same circle. Specifically, the body-side mount 200 is directly fastened to the body 100 at three points in the same circle, and is also fastened to the body 100 with the front cover 300 interposed therebetween at another three points in the same circle. The front cover 300 is fastened to the body-side mount 200 at three points, and is also fastened to the body 100 at the same three points.

In this way, the front cover 300 and the body 100 are secured to the body-side mount 200, and therefore it is difficult for stress to be transferred from the front cover 300 to the body 100. For example, the body-side mount 200, the front cover 300, and the body 100 are fastened together, and therefore it is difficult for twisting stress to occur in the body 100. Therefore, the body 100 is more difficult to deform when stress is placed on the front cover 300. Accordingly, it is possible to restrict the reduction in the positioning accuracy of the imaging unit 160, which is an example of a light receiving unit.

The front cover-side fastening portion 302, the front cover-side fastening portion 304, and the front cover-side fastening portion 306 of the front cover 300 are examples of exterior-side fastening portions that are fastened to the body-side mount 200. The screw 232, the screw 234, and the screw 236 are examples of first fastening members that fasten together the body-side mount 200, the fastening portion of the front cover 300, and the body 100. The screw 231, the screw 233, and the screw 235 are examples of second fastening members that fasten the body 100 to the body-side mount 200 without fastening the body 100 to the front cover 300.

The hole 122 positioned in the floor portion of the recessed portion 112 in the securing section 110 is an example of a first fastening portion that fastens together the body-side mount 200 and the front cover 300 using a screw. The hole 121 positioned in the convex portion 111 of the securing section 110 is an example of a second fastening portion for fastening to the body-side mount 200 without fastening to the front cover 300. In other words, in a state where a first fastening portion of the body 100 is positioned at the bottom of a recessed portion housing an external fastening portion and the external fastening portion is housed in the recessed portion, the body 100 is fastened together with the body-side mount 200 by the screws.

As described above, in a state where the front cover-side fastening portion 302, the front cover-side fastening portion 304, and the front cover-side fastening portion 306 are respectively housed in the recessed portion 112, the recessed portion 114, and the recessed portion 116, the first surface 150 of the body 100 and the surface 332, the surface 334, and the surface 336 of the front cover 300 form a flat surface contacting the mount securing surface 203 of the body-side mount 200. However, the first surface 150 of the body 100 and the surface 332, the surface 334, and the surface 336 of the front cover 300 need not form a flat surface. The surface shape of the surface formed by the first surface 150 of the body 100 and the surface 332, the surface 334, and the surface 336 of the front cover 300 may have a shape corresponding to the surface shape of the mount securing surface 203 of the body-side mount 200. A portion of each of the front cover-side fastening portion 302, the front cover-side fastening portion 304, and the front cover-side fastening portion 306 may be housed in the corresponding recessed portion 112, recessed portion 114, and recessed portion 116. In a state where a portion of each of the front cover-side fastening portion 302, the front cover-side fastening portion 304, and the front cover-side fastening portion 306 is housed in the corresponding recessed portion 112, recessed portion 114, and recessed portion 116, the surface 332 of the front cover-side fastening portion 302, the surface 334 of the front cover-side fastening portion 304, and the surface 336 of the front cover-side fastening portion 306 may protrude in the positive z axis direction from the first surface 150. Accordingly, at least a portion of each of the front cover-side fastening portion 302, the front cover-side fastening portion 304, and the front cover-side fastening portion 306 may be housed in the corresponding recessed portion 112, recessed portion 114, and recessed portion 116.

If the front cover 300 is at a location near the location on the body 100 where the body-side mount 200 is secured, the front cover 300 may be secured to the body 100. For example, a location of the front cover 300 that protrudes in the positive z axis direction beyond the front surface 301 may be secured to a location on the body 100 that protrudes in the positive z axis direction beyond the front surface 301. For example, the side portion 310 of the front cover 300 may be secured to the securing section 110. As another example, if the front cover 300 has a surface that is substantially parallel to a secure surface that is secured to the body 100 by the body-side mount 200, e.g. the first surface 150, and that is positioned farther on the optical axis side than the front surface 301 in the xy plane, this surface may be secured to the body 100. For example, the surface 308 of the front cover 300 may be fastened to the surface 158 of the front surface 101.

If the front cover 300 is distanced from the location on the body 100 where the body-side mount 200 is secured by less than or equal to a predetermined distance, the front surface 301 of the front cover 300 and the body 100 may be secured. In this case, the position where the front cover 300 and the body 100 are secured is preferably within a range that forms a rectangle surrounding and in contact with the outer ring of the body-side mount 200. Specifically, when the distance from the optical axis to the outer ring of the body-side mount 200 in the xy plane is r, the distance between the optical axis and the position at which the front cover 300 and the body 100 are secured is preferably less than or equal to a value obtained as the product of r and the square root of 2. Also, if the side portion 310 of the front cover 300 is secured to the body 100, the distance between the optical axis and the position at which the front cover 300 and the body 100 are secured is preferably less than or equal to a value obtained as the product of r and the square root of 2.

The following is a basic description of the mounting mechanism for mounting an interchangeable lens on the body-side mount 200. The interchangeable lens is mounted on the body-side mount 200 by a bayonet mechanism. The body-side mount 200 has a claw portion 281 and a claw portion 282. The claw portion 281 and the claw portion 282 are used for mounting the interchangeable lens on the body-side mount 200. The body-side mount 200 includes three claw portions used for mounting the interchangeable lens on the mounting surface 201. The claw portion 281 and the claw portion 282 shown in FIG. 3 are two of the three claw portions of the body-side mount 200. The three claw portions of the body-side mount 200 may be simply referred to as the claw portions.

The claw portion 281 and the claw portion 282 are provided on the side surface 204 of the body-side mount 200. The claw portion 281 and the claw portion 282 protrude toward the inside of the opening 230 of the body-side mount 200. A stepped portion 284 is formed in the side surface 204 of the body-side mount 200 between the claw portion 281 and the claw portion 282 that is adjacent to the claw portion 281. The stepped portion 284 is a portion in the side surface 204 that does not protrude toward the inside of the opening 230. Stepped portions that are the same as the stepped portion 284 are formed between adjacent claw portions in the side surface 204 of the body-side mount 200. Accordingly, three stepped portions are formed in the side surface 204 of the body-side mount 200.

The interchangeable lens includes a lens-side mount for mounting on the body-side mount 200. The lens-side mount of the interchangeable lens includes three claw portions for mounting the interchangeable lens on the body-side mount 200. The three claw portions of the lens-side mount of the interchangeable lens may be referred to as lens-side claw portions.

When mounting the interchangeable lens on the body-side mount 200, in a state where an attachment mark 394 provided on the front cover 300 is aligned around the z axis with an attachment mark provided on the interchangeable lens, the interchangeable lens is inserted into the opening 230 of the body-side mount 200. In a state where the attachment mark of the interchangeable lens and the attachment mark 394 are aligned, the lens-side claw portions of the interchangeable lens are positioned at the stepped portions 284 of the body-side mount 200 in the xy plane.

Accordingly, in a state where the attachment mark of the interchangeable lens and the attachment mark 394 are aligned, when the interchangeable lens is inserted into the opening 230 of the body-side mount 200, the lens-side claw portions of the interchangeable lens pass through the stepped portions 284 of the body-side mount 200 in the negative z axis direction to be inserted up to a position behind the corresponding claw portions. In this state, when the interchangeable lens is rotated around the z axis, the three lens-side claw portions of the interchangeable lens enter behind the corresponding claw portions of the body-side mount 200. The rotation of the interchangeable lens around the z axis is limited by a portion of the camera mount of the interchangeable lens contacting the end portions 288 of the claw portions 281.

A flat spring is secured on the mounting surface 201 of the body-side mount 200 to realize firm contact between the mounting surface 201 and the mounting surface of the lens-side mount, as a result of being sandwiched between the mount securing surface 203 and the first surface 150 of the body 100. The flat spring has a protruding portion that protrudes in the negative z axis direction beyond the surface of the mount securing surface 203 on which the flat spring is secured, and the lens-side mount of the interchangeable lens is biased in the negative z axis direction by the protruding portion of the flat spring. As a result, the interchangeable lens is restricted from moving in the z axis direction relative to the body-side mount 200. The mounting surface of the lens-side mount of the interchangeable lens is in firm contact when touching the mounting surface 201 of the body-side mount 200. In this way, the interchangeable lens is mounted on the body-side mount 200 by the bayonet mechanism.

The mounting surface 201 is a reference surface for determining a flange back. The flange back is determined according to the distance between the mounting surface 201 and the imaging surface of the imaging element in the z axis direction.

A pin hole 290 is formed penetrating through the body-side mount 200 from the mounting surface 201 of the body-side mount 200 to the mount securing surface 203. A lock pin for limiting the rotation of the interchangeable lens relative to the body-side mount 200 is inserted through the pin hole 290. The lock pin is biased in the positive z axis direction by the bias force of a spring. The lock pin protrudes from the mounting surface 201 in the positive z axis direction into the pin hole 290 when the body-side mount 200 is secured to the body 100. A pin hole is formed in the lens-side mount of the interchangeable lens. A portion of the lock pin protruding in the positive z axis direction from the mounting surface 201 is inserted into the pin hole of the interchangeable lens. By inserting the portion of the lock pin into the pin hole of the interchangeable lens, the rotation of the interchangeable lens mounted on the body-side mount 200 around the z axis is limited.

An opening 390 for exposing a lock release button to the outside is formed in the front cover 300. When the lock release button is pressed, the lock pin moves in conjunction with the movement of the lock release button to be displaced in the negative z axis direction against the bias force of the spring. When the entire lock pin is displaced beyond the mounting surface 201 in the negative z axis direction, it is possible for the interchangeable lens to rotate around the x axis.

When the interchangeable lens is mounted on the body-side mount 200, the light that has passed through the interchangeable lens can pass further inward than the claw portions of the body-side mount 200. The claw portions of the body-side mount 200 determine an opening diameter of the mount. The opening diameter of the mount is determined to be a value that is twice the distance between a claw portion and the z axis in the xy plane.

The attachment mark 394 may be colored a different color than the color around the attachment mark 394 in the front cover 300. The attachment mark 394 is provided on the front cover 300. However, a similar attachment mark may be provided on the body-side mount 200. For example, an attachment mark may be formed on the mounting surface 201 of the body-side mount 200. The attachment mark 394 is formed at a location that is depressed beyond the mounting surface 201 of the body-side mount 200.

In the above example, the hole 221, the hole 222, the hole 223, the hole 224, the hole 225, and the hole 226 of the body-side mount 200 are positioned in the same circle in the xy plane. The hole 222, the hole 224, and the hole 226 may be arranged in the same circle. The hole 221, the hole 223, and the hole 225 may be positioned in the same circle. Here, the center of the circle passing through the hole 221, the hole 223, and the hole 225 preferably matches the center of the circle passing through the hole 222, the hole 224, and the hole 226. As an example, the diameter of the circle passing through the hole 221, the hole 223, and the hole 225 and the diameter of the circle passing through the hole 222, the hole 224, and the hole 226 may be the same or may be different. For example, the diameter of the circle passing through the centers of each of the hole 221, the hole 223, and the hole 225 and the diameter of the circle passing through the centers of each of the hole 222, the hole 224, and the hole 226 may be the same or may be different. If the diameter of the circle passing through the hole 221, the hole 223, and the hole 225 is different from the diameter of the circle passing through the hole 222, the hole 224, and the hole 226, the diameter of the circle passing through the hole 222, the hole 224, and the hole 226 may be greater than the diameter of the circle passing through the hole 221, the hole 223, and the hole 225. It should be noted that the positional relationship of the hole 221, the hole 222, the hole 223, the hole 224, the hole 225, and the hole 226 is not limited to this example. As another example, the hole 221, the hole 222, the hole 223, the hole 224, the hole 225, and the hole 226 may be positioned at any position in the mounting surface 201, as long as these holes are formed in the mounting surface 201.

The hole 322 need not be a through-hole. In this case, the hole 322 may be a female thread. The hole 322 may be a female thread that penetrates through the front cover-side fastening portion 302. The hole 324 need not be a through-hole. In this case, the hole 324 may be a female thread. The hole 324 may be a female thread that penetrates through the front cover-side fastening portion 304. The hole 326 need not be a through-hole. In this case, the hole 326 may be a female thread. The hole 326 may be a female thread that penetrates through the front cover-side fastening portion 306. If the hole 322 is not a through-hole, the body 100 need not include the hole 122. If the hole 324 is not a through-hole, the body 100 need not include the hole 124. If the hole 326 is not a through-hole, the body 100 need not include the hole 126.

If the hole 322 is a female thread, the body-side mount 200 and the front cover-side fastening portion 302 may be fastened by the screw 232. In this case the front cover-side fastening portion 302 and the body 100 need not be fastened. If the hole 324 is a female thread, the body-side mount 200 and the front cover-side fastening portion 304 may be fastened by the screw 234. In this case the front cover-side fastening portion 304 and the body 100 need not be fastened. If the hole 326 is a female thread, the body-side mount 200 and the front cover-side fastening portion 306 may be fastened by the screw 236. In this case the front cover-side fastening portion 306 and the body 100 need not be fastened.

The hole 121, the hole 122, the hole 123, the hole 124, the hole 125, and the hole 126 need not be through-holes. In this case, the hole 121, the hole 122, the hole 123, the hole 124, the hole 125, and the hole 126 may be female threads.

In the imaging device 10, the exterior of the imaging device 10 is formed by the three covers that are the front cover 300, the top cover 400, and the back cover 500. However, the exterior of the imaging device 10 may be formed by two covers. If the exterior of the imaging device 10 is formed by two covers, the body 100 is covered by these two covers. The exterior of the imaging device 10 may be formed by four covers. If the exterior of the imaging device 10 is formed by four covers, the body 100 is covered by these four covers. The exterior of the imaging device 10 may be formed by two or more covers.

As described above, the body-side mount 200 is formed of metal and the front cover 300 is formed of resin. However, the material forming the body-side mount 200 is not limited to metal, as long as the material used results in the stiffness of the body-side mount 200 being greater than the stiffness of the front cover 300. For example, the body-side mount 200 may be formed of resin. In the same manner, the material forming the front cover 300 is not limited to resin. For example, the front cover 300 may be formed of metal.

Figure 4:
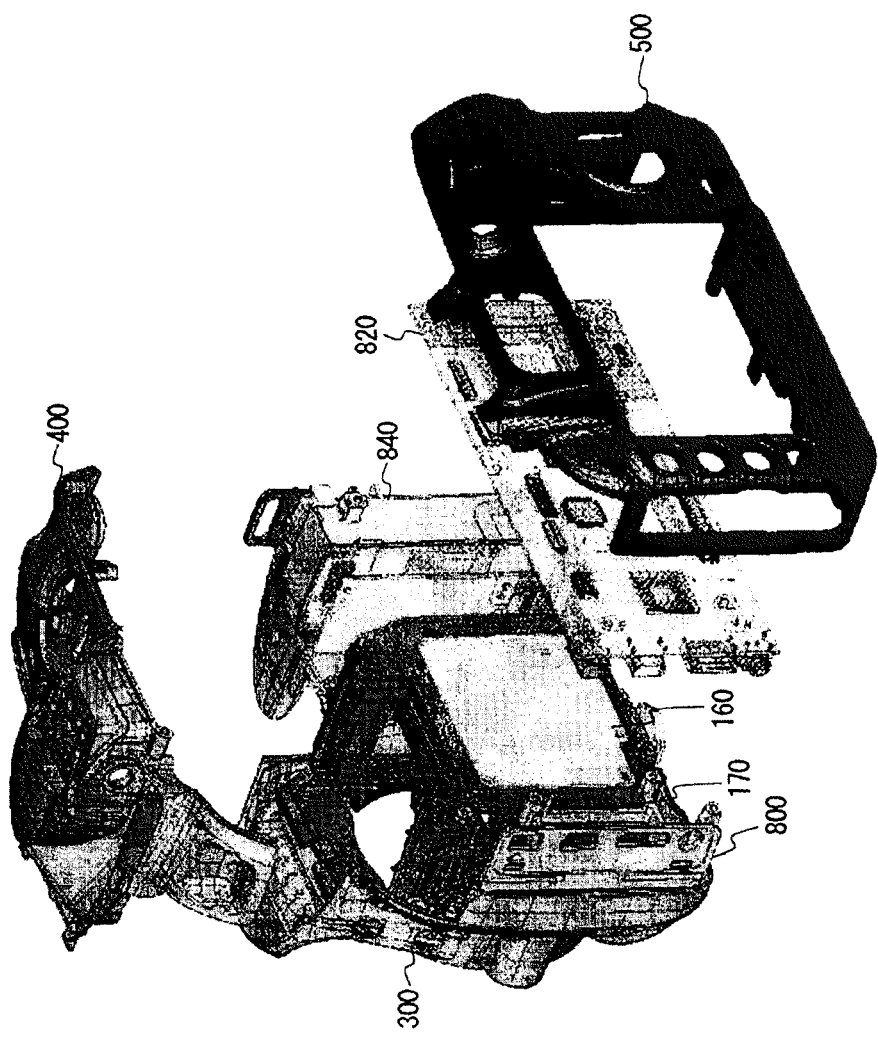
FIG. 4 is an exploded perspective view of the imaging device 10.

FIG. 4 is an exploded perspective view of the imaging device 10. FIG. 4 shows an electronic device substrate 820, a power supply unit 840, and the imaging unit 160, along with the body 100, the front cover 300, the top cover 400, and the back cover 500.

The imaging unit 160 includes an imaging element that receives light from a subject. The imaging unit 160 is fastened and secured to the bracket 170. In this way, the imaging unit 160 is secured to the body 100 via the bracket 170.

An electronic component for processing a signal output from the imaging element of the imaging unit 160 is implemented on the electronic device substrate 820. The imaging unit 160 and the electronic device substrate 820 are connected via a circuit board such as a flexible print substrate interposed therebetween.

The power supply unit 840 supplies power to each component of the imaging device 10. The power from the power supply unit 840 is supplied to the electronic device substrate 820 via the circuit board such as the flexible print substrate. The power from the power supply unit 840 may be supplied to the imaging unit 160 via the electronic device substrate 820.

The substrate cover 800 is secured to the front cover 300. The electronic device substrate 820 is secured to the substrate cover 800.

As described above, the front cover 300 is rigidly connected by screws to the securing section 110 of the body 100. The front cover 300 is not rigidly connected to the body 100 at any location other than the securing section 110. For example, when stress is placed on the front cover 300, the stress transferred to the back surface 102 of the body 100 via the substrate cover 800, the electronic device substrate 820, and the circuit board is much less than the stress transferred to the securing section 110 of the front surface 101. The securing section 110 of the body 100 has the body-side mount 200 secured thereto, and therefore the securing section 110 has higher stiffness than the back surface 102. Accordingly, even when stress is transferred to the securing section 110, the body 100 does not significantly deform. Therefore, it is possible to significantly reduce the effect on the positioning accuracy of the imaging unit 160 caused by the stress placed on the front cover 300.

Figure 5:
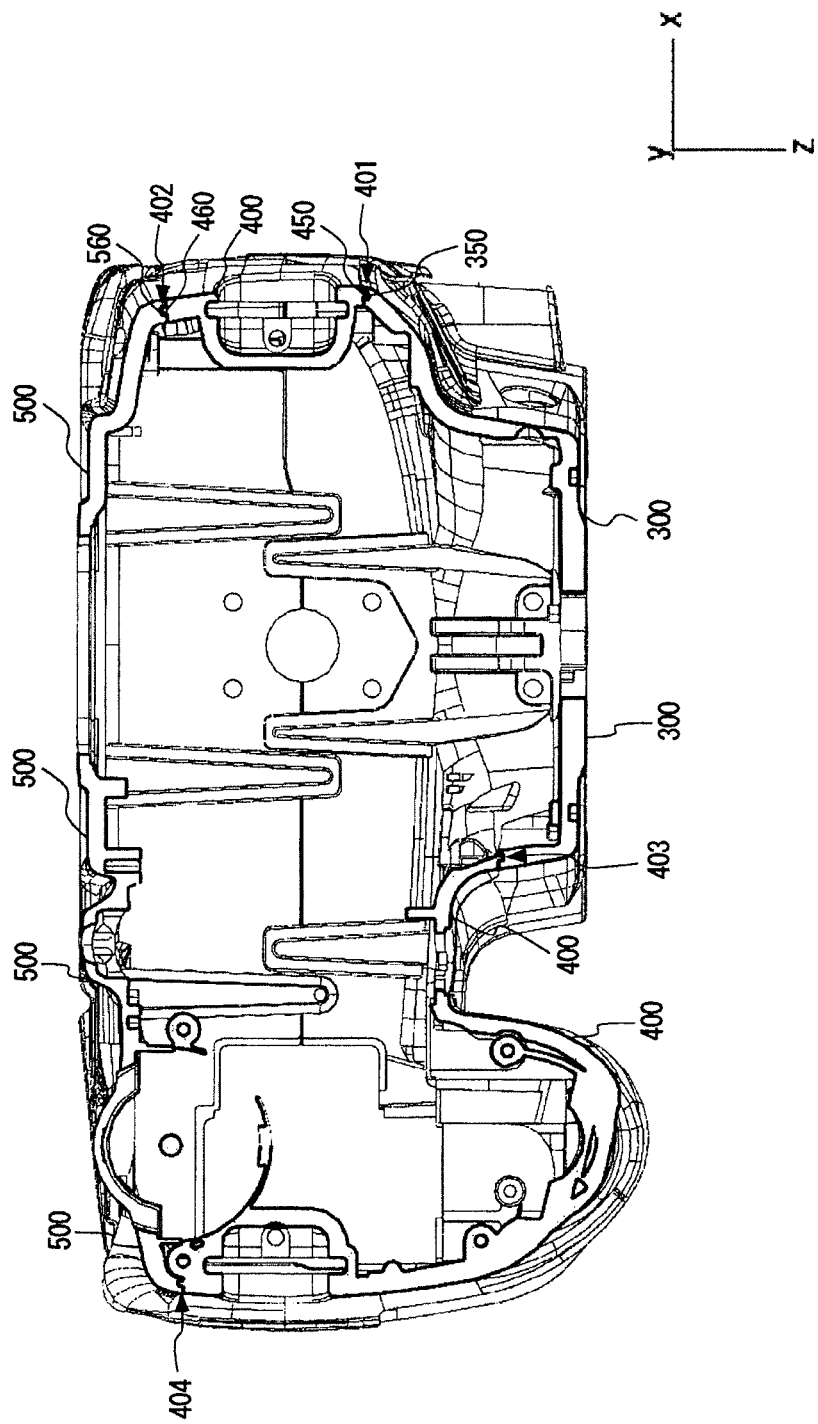
FIG. 5 is a cross-sectional view obtained by cutting the imaging device 10 in the xy plane.

FIG. 5 is a cross-sectional view obtained by cutting the imaging device 10 in the xy plane. FIG. 5 shows the front cover 300, the top cover 400, and the back cover 500.

The front cover 300 and the top cover 400 are connected by a spigot structure. At the connecting section 401 connecting the front cover 300 and the top cover 400, the top cover 400 includes a convex portion 450 that protrudes in the positive z axis direction from the surface facing the front cover 300. The front cover 300 includes a recessed portion 350 that is recessed in the positive z axis direction from the surface facing the top cover 400. The front cover 300 and the top cover 400 are connected by engagement between the recessed portion 350 of the front cover 300 and the convex portion 450 of the top cover 400.

The front cover 300 and the back cover 500 are connected by a spigot structure. At the connecting section 402 connecting the front cover 300 and the back cover 500, the top cover 400 includes a convex portion 460 that protrudes in the negative z axis direction from the surface facing the back cover 500. The back cover 500 includes a recessed portion 560 that is depressed in the negative z axis direction from the surface facing the top cover 400. The back cover 500 and the top cover 400 are connected by engagement between the recessed portion 560 of the back cover 500 and the convex portion 460 of the top cover 400.

In a similar manner, at the connecting section 403 connecting the front cover 300 and the top cover 400, the front cover 300 and the top cover 400 are connected by a spigot structure. In a similar manner, at the connecting section 404 connecting the back cover 500 and the top cover 400, the back cover 500 and the top cover 400 are connected by a spigot structure.

Although not shown in FIG. 5, as described above, at the contact surface between the front cover 300 and the back cover 500, the front cover 300 and the back cover 500 are connected by a spigot structure. In this way, the front cover 300 and the top cover 400 are connected by a spigot structure along the contact surface between the front cover 300 and the top cover 400. Furthermore, the top cover 400 and the back cover 500 are connected by a spigot structure along the contact surface between the top cover 400 and the back cover 500. The front cover 300 and the back cover 500 are connected by a spigot structure along the contact surface between the front cover 300 and the back cover 500. In this way, the front cover 300, the top cover 400, and the back cover 500 are connected by spigot structures at the contact surfaces with the other covers. Therefore, when stress is placed on any one of the front cover 300, the top cover 400, and the back cover 500, it is possible to restrict shifting in the direction parallel to the contact surfaces with the other covers.

The exterior portion formed by the front cover 300, the top cover 400, and the back cover 500 has a monocoque structure for receiving stress. As described above, the front cover 300, the top cover 400, and the back cover 500 have contact surfaces that are connected to each other with a spigot structure, and therefore the monocoque structure is preserved despite forming the exterior with a plurality of components such as the front cover 300, the top cover 400, and the back cover 500.

The weight of the body 100 is preferably approximately the same as the weight of other components of the imaging device 10. By making the weight of the body 100 be approximately the same as the weight of the other components of the imaging device 10, it is possible to attenuate vibration caused by the movement of the shutter, mirror, or the like in the body 100. The error between the weight of the body 100 and the weight of the other components is preferably no greater than 5%. If the weight of the body 100 differs from the weight of the other components, the body 100 is preferably heavier than the other components.

Figure 6:
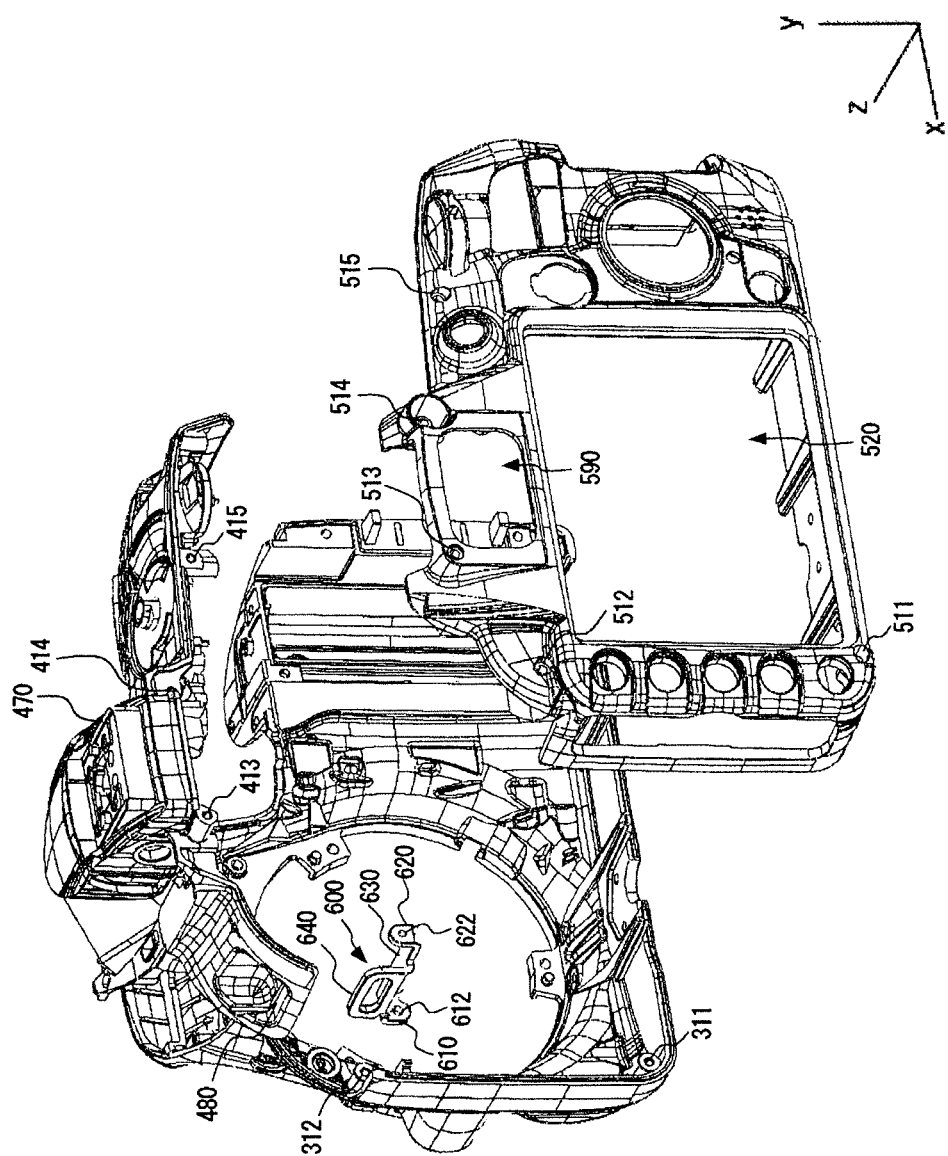
FIG. 6 is an exploded perspective view schematically showing assembly of the front cover 300, the top cover 400, the back cover 500, and the suspension ring 600.
Figure 7:
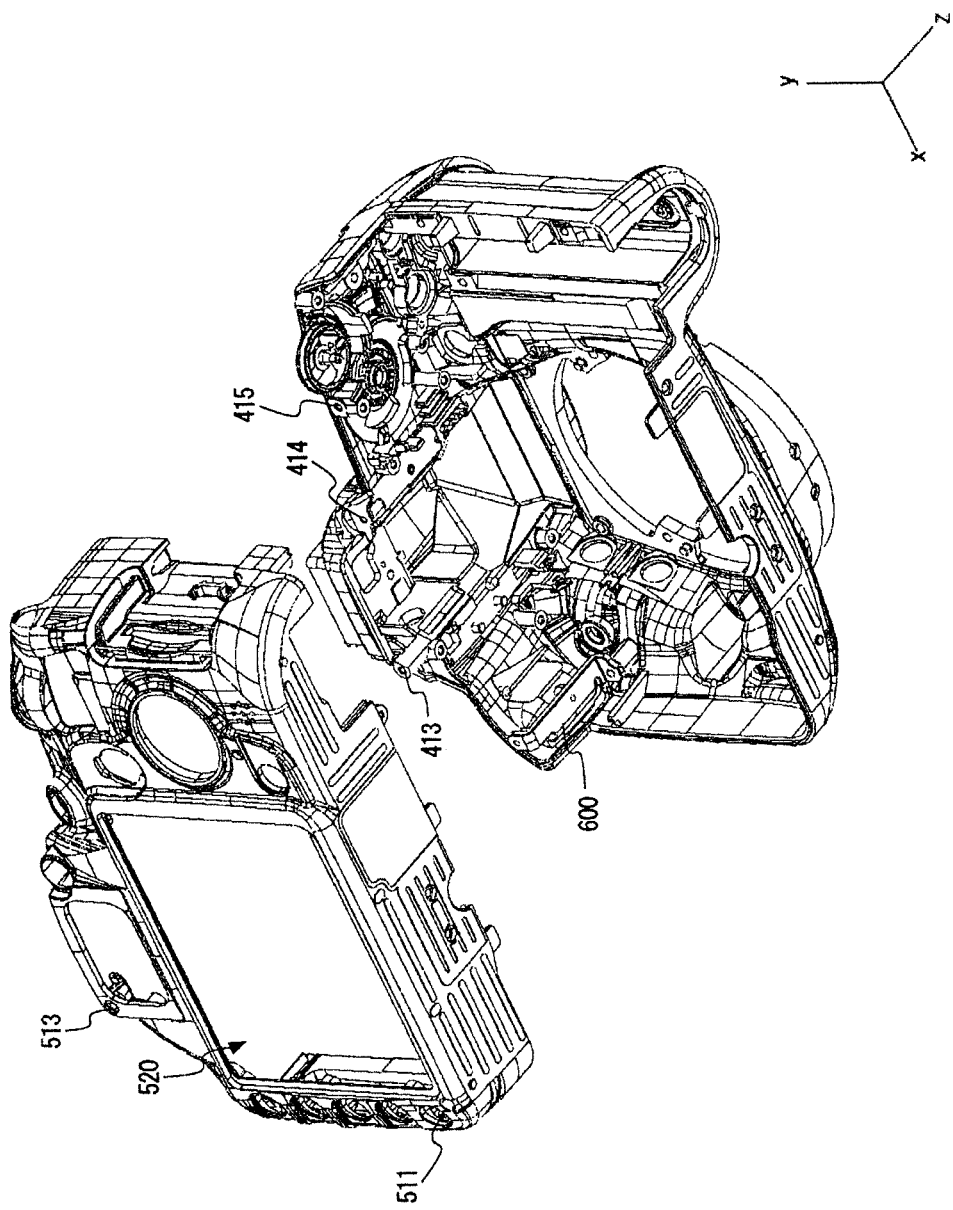
FIG. 7 is an exploded perspective view showing a state in which the suspension ring 600 is positionally fixed to the top cover 400.

FIG. 6 is an exploded perspective view schematically showing assembly of the front cover 300, the top cover 400, the back cover 500, and the suspension ring 600. FIG. 7 is an exploded perspective view showing a state in which the suspension ring 600 is positionally fixed to the top cover 400.

The back cover 500 includes a screw hole 511, a screw hole 512, a screw hole 513, a screw hole 514, and a screw hole 515. The screw hole 511, the screw hole 512, the screw hole 513, the screw hole 514, and the screw hole 515 are each formed along the z axis direction. The top cover 400 includes a screw hole 413, a screw hole 414, and a screw hole 415. The screw hole 413, the screw hole 414, and the screw hole 415 are each formed along the z axis direction. The front cover 300 includes a screw hole 311 and a screw hole 312. The screw hole 311 and the screw hole 312 are each formed along the z axis direction.

The top cover 400 and the back cover 500 are fastened by screws in a state where the screw hole 413 and the screw hole 513 are positionally fixed, the screw hole 414 and the screw hole 514 are positionally fixed, and the screw hole 415 and the screw hole 515 are positionally fixed. The front cover 300 and the back cover 500 are fastened by screws in a state where the screw hole 311 and the screw hole 511 are positionally fixed.

The suspension ring 600 is secured to the front cover 300 and the back cover 500. The suspension ring 600 is formed of metal. The suspension ring 600 is a metal fitting for attaching a hanging strap to the imaging device 10.

The suspension ring 600 includes a front-side fastening portion 610, a back-side fastening portion 620, a connecting portion 630 that connects the front-side fastening portion 610 and the back-side fastening portion 620, and a ring portion 640. The suspension ring 600 is secured in a state where the ring portion 640 protrudes from the opening 480 formed in the top cover 400. A strap can be attached to the ring portion 640. The strap may be attached to the ring portion 640 via a metal fitting for attaching a triangular ring or the like to which the strap is attached.

The front-side fastening portion 610 is positioned farther in the positive z axis direction than the back-side fastening portion 620. The front-side fastening portion 610 has a surface that is parallel to the xy plane and extends in the positive y axis direction from the connecting portion 630. The back-side fastening portion 620 has a surface that is parallel to the xy plane and extends in the negative y axis direction from the connecting portion 630. The connecting portion 630 extends in the z axis direction. The connecting portion 630 connects a top portion of the front-side fastening portion 610 to a bottom portion of the back-side fastening portion 620.

The front-side fastening portion 610 has a screw hole 612 formed along the z axis direction. The back-side fastening portion 620 has a screw hole 622 formed along the z axis direction.

The front cover 300 and the suspension ring 600 are fastened by a screw in a state where the screw hole 312 and the screw hole 612 are positionally fixed. The suspension ring 600 and the back cover 500 are fastened by a screw in a state where the screw hole 622 and the screw hole 512 are positionally fixed. In this way, the front cover 300 and the back cover 500 are secured via the suspension ring 600.

As described above, the top cover 400 and the back cover 500 have a contact surface that is substantially orthogonal to the z axis direction. The top cover 400 and the back cover 500 are fastened by screws with a fastening axis along the z axis direction. In the same manner, the front cover 300 and the back cover 500 have a contact surface that is substantially orthogonal to the z axis direction. The front cover 300 and the back cover 500 are fastened by screws with a fastening axis along the z axis direction. Therefore, it is possible to further restrict sliding of the contact surfaces. Although not shown in FIGS. 6 and 7, the front cover 300 and the top cover 400 are fastened by screws with a fastening axis along the z axis direction.

As described above, the front cover 300, the top cover 400, and the back cover 500 have fastening axes orthogonal to the contact surfaces therebetween, and therefore the stress applied to any one of these covers can be transferred efficiently to the other covers. Therefore, it is possible to preserve the monocoque structure despite forming the exterior portion with a plurality of components such as the front cover 300, the top cover 400, and the back cover 500. Accordingly, it is possible to diffuse the stress placed on any one of the front cover 300, the top cover 400, and the back cover 500 to other covers. For example, when stress is placed on the back cover 500 from the outside, the stress placed on the back cover 500 from the outside can be diffused to the front cover 300 and the top cover 400. Accordingly, it is possible to decrease the stress value received by the back cover 500. In this way, it is possible to restrict the focusing of stress on a single one of the front cover 300, the top cover 400, and the back cover 500, and therefore it is possible to restrict damage to each cover. Accordingly, it is possible to increase the shock resistance. Furthermore, it is possible to omit support members, and therefore the imaging device 10 can be made lighter weight. Yet further, even if there is a significant error in the dimensions of the front cover 300, the top cover 400, and the back cover 500, it is possible to remove gaps between the covers at the contact surfaces therebetween. Therefore, it is possible to increase the quality of the outside appearance of the imaging device 10.

One end of the suspension ring 600 is secured to the front cover 300, and the other end of the suspension ring 600 is secured to the back cover 500. Stress is placed on the suspension ring 600 by the attached strap, but since the suspension ring 600 is secured to both the front cover 300 and the back cover 500, it is possible to diffuse the stress placed on the suspension ring 600 to the front cover 300 and the back cover 500.

The screw holes for fastening the front cover 300, the top cover 400, and the back cover 500 to each other are provided at the corners when viewing the entire outside appearance of the imaging device 10. For example, the imaging device 10 has an overall box shape, and the screw hole 511 and the screw hole 512 are provided in the back cover 500 at corners of this box shape. Therefore, the stress can be diffused across two edges and the number of fastening members such as the screws can be reduced. The screw hole 513 and the screw hole 514 are provided at the corners of the finder opening 590 of the top cover 400. In the top cover 400, the screw hole 413 and the screw hole 414 are positioned near the accessory shoe 470. The screw hole 413 and the screw hole 414 are arranged at positions enabling stress to be diffused when stress is placed on the accessory shoe 470 due to mounting of an external accessory. For example, the screw hole 413 and the screw hole 414 are arranged at locations where the stress placed on the accessory shoe 470 from an external accessory is greater than a predetermined value. As another example, the screw hole 413 and the screw hole 414 are arranged near a stress line caused by an external accessory.

Figure 8:
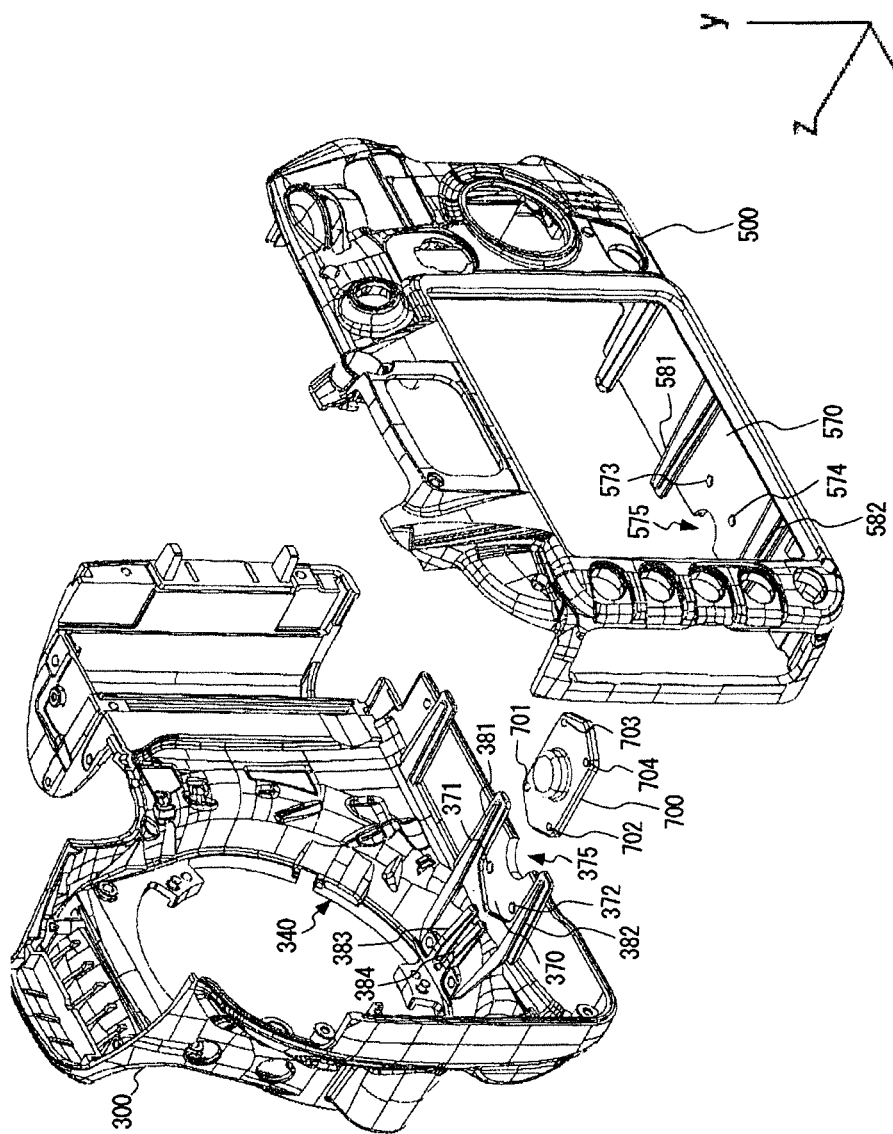
FIG. 8 is an exploded perspective view schematically showing the assembly of the front cover 300, the back cover 500, and a tripod base 700.
Figure 9:
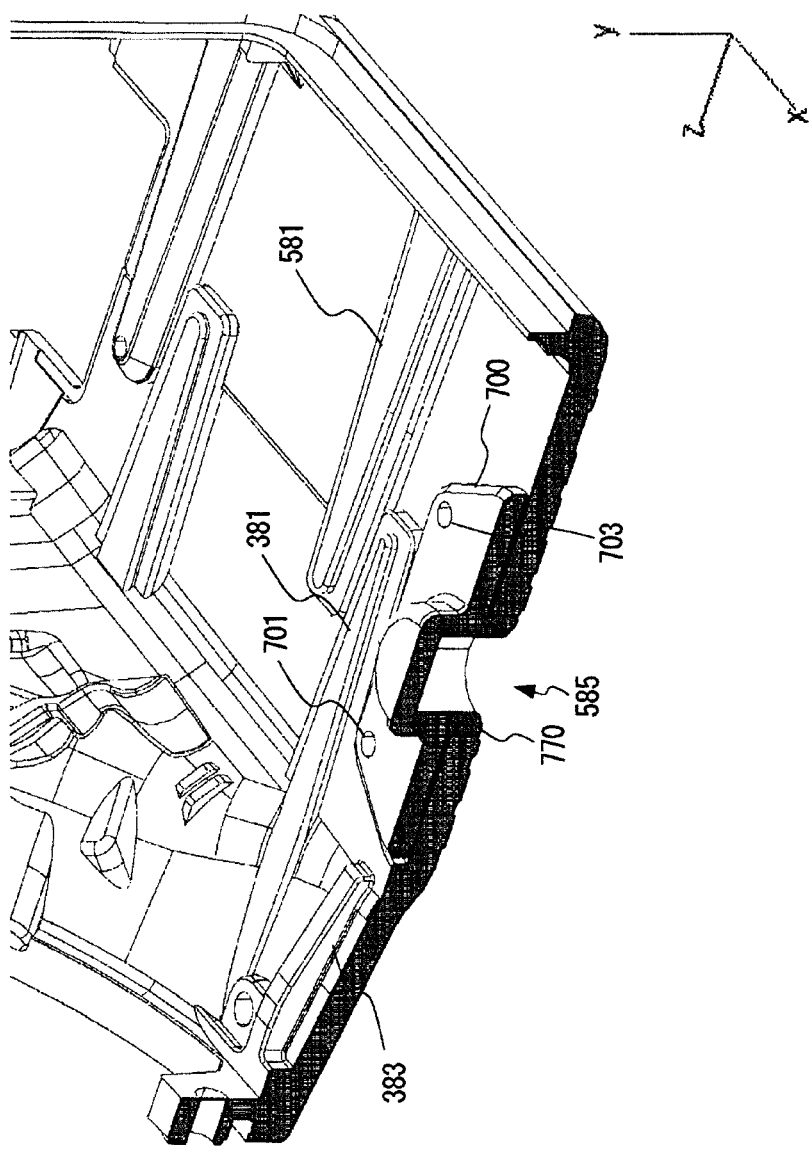
FIG. 9 is a cross-sectional view of a yz cross section schematically showing a state in which the tripod base 700 is assembled with the front cover 300 and the back cover 500.

FIG. 8 is an exploded perspective view schematically showing the assembly of the front cover 300, the back cover 500, and a tripod base 700. FIG. 9 is a cross-sectional view of a yz cross section schematically showing a state in which the tripod base 700 is assembled with the front cover 300 and the back cover 500.

The front cover 300 includes a rib 381 and a rib 382 on a loading surface 370 on which a portion of the tripod base 700 is loaded. The rib 381 and the rib 382 are distanced from each other in the x axis direction. The rib 381 and the rib 382 extend in a direction toward the position of the securing section 110. A portion of the tripod base 700 is housed between the rib 381 and the rib 382. The front cover 300 further includes a rib 383 and a rib 384 that extend toward the securing section 110. The rib 383 and the rib 384 are positioned between the rib 381 and the rib 382 in the x axis direction. The rib 383 and the rib 384 are positioned between the securing section 110 and the position where the tripod base 700 is secured in the z axis direction.

A screw hole 371 and a screw hole 372 are formed in the loading surface 370. A notched portion 375 having a semicircular shape in the xz plane is formed in the loading surface 370.

In the back cover 500, a screw hole 573 and a screw hole 574 are formed in a loading surface 570 on which a portion of the tripod base 700 is loaded. The loading surface 570 includes a rib 581 and a rib 582. The rib 581 and the rib 582 extend in the z axis direction. When the front cover 300 and the back cover 500 are aligned, the rib 581 is adjacent to the rib 381 at a position on the negative x axis direction side of the rib 381. The rib 582 is adjacent to the rib 382 at a position on the positive x axis direction side of the rib 382. The height to which the rib 381 and the rib 382 protrude from the loading surface 370 is preferably greater than the height to which the rib 581 and the rib 582 protrude from the loading surface 570.

A notched portion 575 having a semicircular shape in the xz plane is formed in the loading surface 570. When the front cover 300 and the back cover 500 are aligned, the notched portion 375 and the notched portion 575 form a housing opening 585 that houses the attaching portion 770 for attaching the tripod base 700 to a tripod.

A screw hole 701, a screw hole 702, a screw hole 703, and a screw hole 704 are formed in the tripod base 700. The screw hole 701 corresponds to the screw hole 371, the screw hole 702 corresponds to the screw hole 372, the screw hole 703 corresponds to the screw hole 573, and the screw hole 704 corresponds to the screw hole 574. Specifically, in a state where the tripod base 700 is sandwiched between the rib 381 and the rib 382 and loaded on the loading surface 370, the screw hole 701 is positionally fixed at the position of the screw hole 371 and the screw hole 702 is positionally fixed at the position of the screw hole 372. Furthermore, in a state where the front cover 300 and the back cover 500 are positionally fixed, the screw hole 703 is positionally fixed at the position of the screw hole 573 and the screw hole 704 is positionally fixed at the position of the screw hole 574. In a state where the front cover 300 and the back cover 500 are aligned, the tripod base 700 is fastened to the front cover 300 by inserting screws through the screw hole 701 and the screw hole 702. Furthermore, the tripod base 700 is fastened to the back cover 500 by inserting screws through the screw hole 703 and the screw hole 704.

The rib 381 and the rib 382 protrude in the negative z axis direction beyond the edge of the loading surface 370 positioned on the negative z axis direction side. The rib 581 and the rib 582 protrude in the positive z axis direction beyond the edge of the loading surface 570 positioned on the positive z axis direction side. Accordingly, the position at which the front cover 300 and the back cover 500 are connected can be restricted from being displaced in a direction away from the tripod base 700.

In this way, one end of the tripod base 700 is secured to the front cover 300 and the other end of the tripod base 700 is secured to the back cover 500. Stress is placed on the tripod base 700 by the attached tripod, but since the tripod base 700 is fastened to both the front cover 300 and the back cover 500, it is possible to diffuse the stress placed on the tripod base 700 to the front cover 300 and the back cover 500.

The front cover 300 includes the rib 381, the rib 382, the rib 383, and the rib 384, and therefore deformation of the front cover 300 caused by stressed placed thereon via the tripod base 700 can be restricted. In particular, the rib 381, the rib 382, the rib 383, and the rib 384 extend from a position near where the tripod base 700 is secured to a position near the securing section 110. Therefore, it is possible to restrict localized stress from being focused between the securing section 110 and the position where the tripod base 700 is secured and causing localized bending of the front cover 300.

The length of the tripod base 700 in the z axis direction is greater than the length of the tripod base 700 in the x axis direction. It order to avoid the focusing of stress placed on the tripod base 700, it is more preferable for the length of the tripod base 700 in the z axis direction to be longer. The tripod base 700 more preferably extends to a position closer to the securing section 110.

When forming the front cover 300 using resin molding, the rib 381, the rib 382, the rib 383, and the rib 384 are preferably formed in a manner to not include welding. In particular, it is preferable that weld lines do not intersect with the extension direction of the rib 381, the rib 382, the rib 383, and the rib 384. A gate is preferably arranged such that the resin flows parallel to the extension direction of the rib 381, the rib 382, the rib 383, and the rib 384. A gate faucet is preferably arranged in a mold that is continuous from the securing section 110 to the rib 381, the rib 382, the rib 383, and the rib 384. A guide wall may be formed to guide the resin to form the rib 381, the rib 382, the rib 383, and the rib 384.

Figure 10:
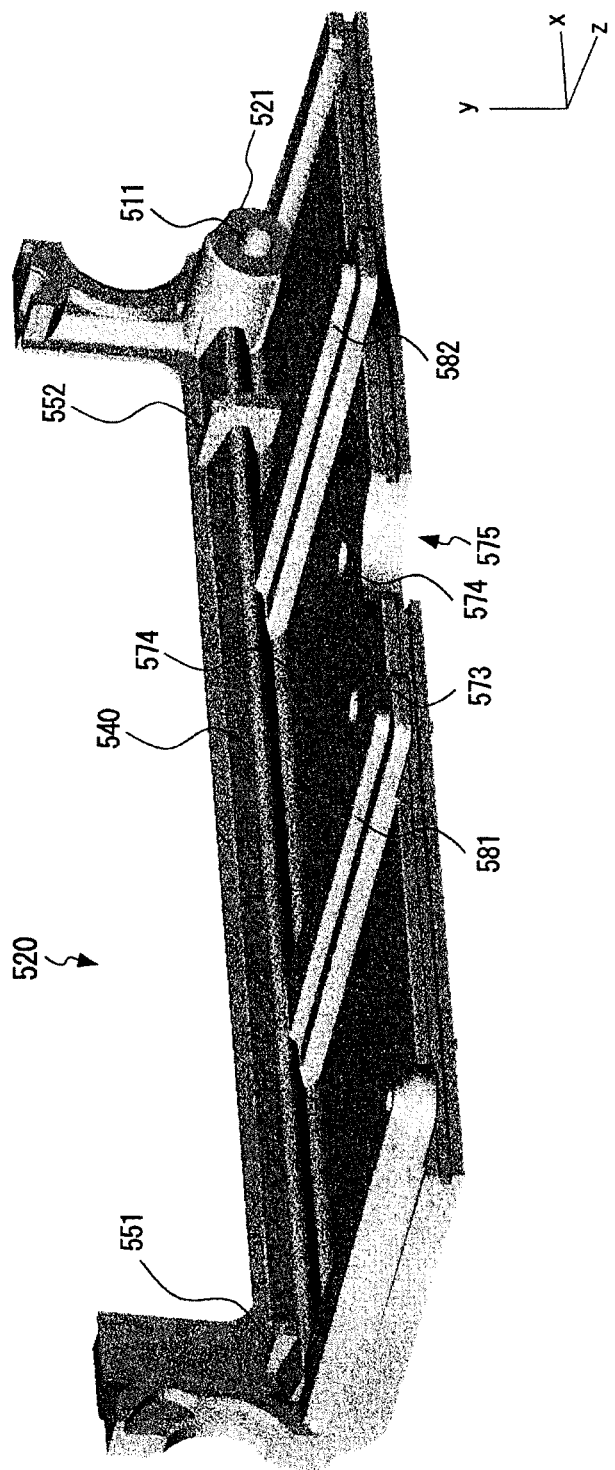
FIG. 10 is a perspective view of a portion of the back cover 500.

FIG. 10 is a perspective view of a portion of the back cover 500. FIG. 10 particularly shows the floor portion and the opening 520 of the back cover 500. The opening 520 is an opening for exposing the display surface of a display apparatus to the outside form the imaging device 10.

The back cover 500 includes a rib 540 that is positioned below the opening 520. The rib 540 extends in the x axis direction. The length of the rib 540 in the x axis direction is greater than the length of the opening 520 in the x axis direction. The rib 540 extends in the negative x axis direction beyond the end portion of the opening 520 on the negative x axis direction side. The rib 540 extends to the fastening portion 521 in which a screw hole 511 is formed.

A support portion 551 and a support portion 552 supporting the display apparatus are provided on the rib 540. The display apparatus is in contact with and supported from below by the support portion 551 and the support portion 552.

The rib 581 and the rib 582 extend to the rib 540. Therefore, it is possible to restrict the localized focusing of stress in the loading surface 570.

Figure 11:
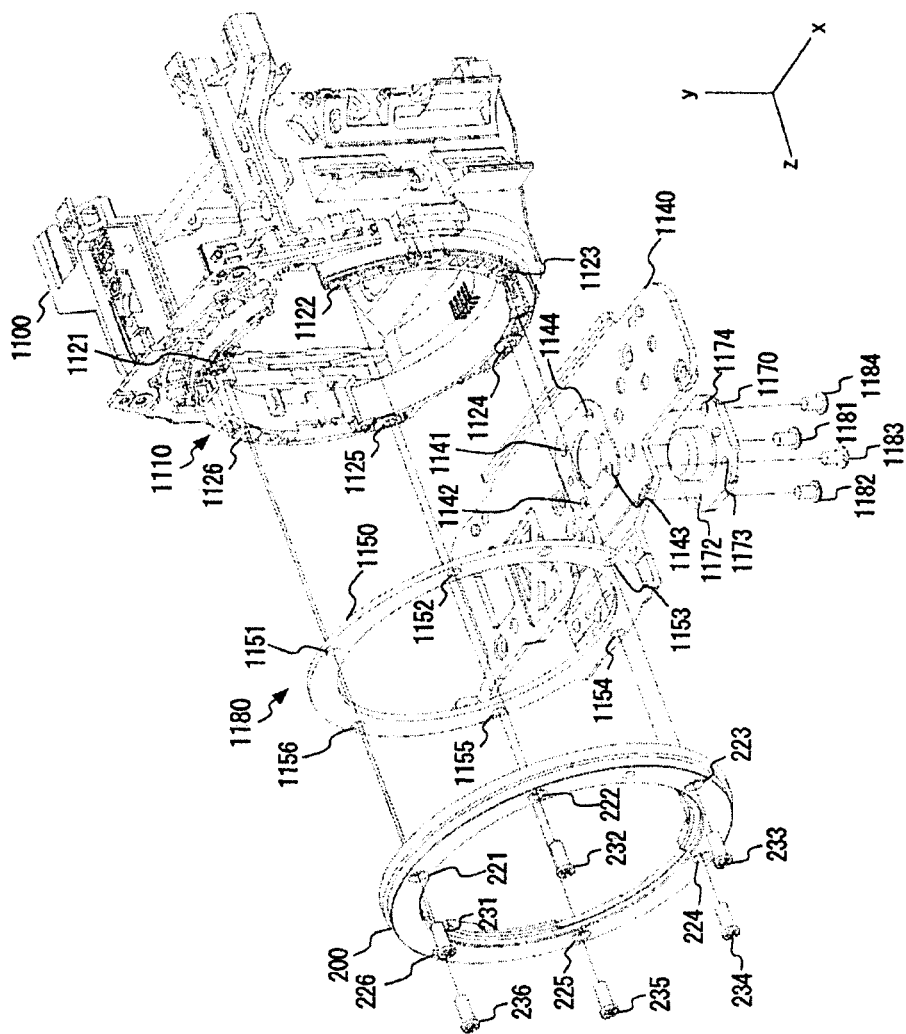
FIG. 11 is an exploded perspective view schematically showing another assembly example of the tripod base assembly.

FIG. 11 is an exploded perspective view schematically showing another assembly example of the tripod base assembly. In this assembly example, a tripod base attaching member 1180 securing a tripod base 1170 is fastened together with the body-side mount 200 and a body 1100.

The body-side mount 200 has the same structure as the body-side mount 200 described in relation to FIGS. 1 to 10. The body 1100 is formed of resin, in the same manner as the body 100. The tripod base attaching member 1180 and the tripod base 1170 are formed of metal. The tripod base 1170 is a metal fitting for attaching a tripod.

The tripod base attaching member 1180 includes a securing section 1150 and a tripod base attaching portion 1140. The tripod base attaching member 1180 has an overall L shape when cut in the xy plane. When the tripod base attaching member 1180 and the body 1100 are aligned, the tripod base attaching portion 1140 is positioned below the body 1100.

Four female threads that are a female thread 1141, a female thread 1142, a female thread 1143, and a female thread 1144 are formed in the tripod base attaching portion 1140. Four through-holes including a hole 1172, a hole 1173, and a hole 1174 are formed in the tripod base 1170. When the tripod base 1170 is aligned with the tripod base attaching portion 1140, the four screw holes formed in the tripod base attaching portion 1140 are positionally fixed at the positions of the four holes formed in the tripod base 1170, in a one-to-one manner. For example, the female thread 1142 is positionally fixed at the position of the hole 1172, the female thread 1143 is positionally fixed at the position of the hole 1173, and the female thread 1144 is positionally fixed at the position of the hole 1174. In this state, the screw 1181 is inserted through the female thread 1141, the screw 1182 is inserted through the female thread 1142, the screw 1183 is inserted through the female thread 1143, and the screw 1184 is inserted through the female thread 1144, thereby fastening the tripod base 1170 to the tripod base attaching portion 1140.

A female thread 1121, a female thread 1122, a female thread 1123, a female thread 1124, a female thread 1125, and a female thread 1126 are formed in the securing section 1110 of the body 1100. A hole 1151, a hole 1152, a hole 1153, a hole 1154, a hole 1155, and a hole 1156 that are through-holes are formed in the securing section 1150 of the tripod base attaching member 1180.

The body-side mount 200, the securing section 1150, and the securing section 1110 have ring shapes corresponding to each other. The body-side mount 200, the securing section 1150, and the securing section 1110, when aligned with each other, each have six screw holes that are positionally fixed at the same positions in the xy plane. When in the aligned state, the body-side mount 200, the securing section 1150, and the securing section 1110 are fastened together by the screw 231, the screw 232, the screw 233, the screw 234, the screw 235, and the screw 236. In a state where the securing section 1150 is sandwiched between the body-side mount 200 and the body 1100, the tripod base attaching member 1180 is secured to the body-side mount 200 and the body 1100.

Specifically, when the hole 221, the female thread 1121, and the hole 1151 are in the aligned state, the screw 231 is inserted therethrough. When the hole 222, the female thread 1122, and the hole 1152 are in the aligned state, the screw 232 is inserted therethrough. When the hole 223, the female thread 1123, and the hole 1153 are in the aligned state, the screw 233 is inserted therethrough. When the hole 224, the female thread 1124, and the hole 1154 are in the aligned state, the screw 234 is inserted therethrough. When the hole 225, the female thread 1125, and the hole 1155 are in the aligned state, the screw 235 is inserted therethrough. When the hole 226, the female thread 1126, and the hole 1156 are in the aligned state, the screw 236 is inserted therethrough. In this way, the body 1100, the tripod base attaching member 1180, and the body-side mount 200 are fastened together at six points.

In this way, the tripod base attaching member 1180 is secured to the body-side mount 200. In particular, the body-side mount 200, the tripod base attaching member 1180, and the body 1100 are secured at six points positioned in the same circle. Therefore, the stress placed on the tripod base 1170 from the tripod can be absorbed by the body-side mount 200 via the tripod base attaching member 1180.

When the tripod base attaching member 1180 is secured between the body-side mount 200 and the securing section 1110, such as in this assembly example, the front cover 300 may be secured near the securing section 1110. Other structures including the front cover 300, the top cover 400, and the back cover 500 can adopt the same structure as described in relation to FIGS. 1 to 10.

Figure 12:
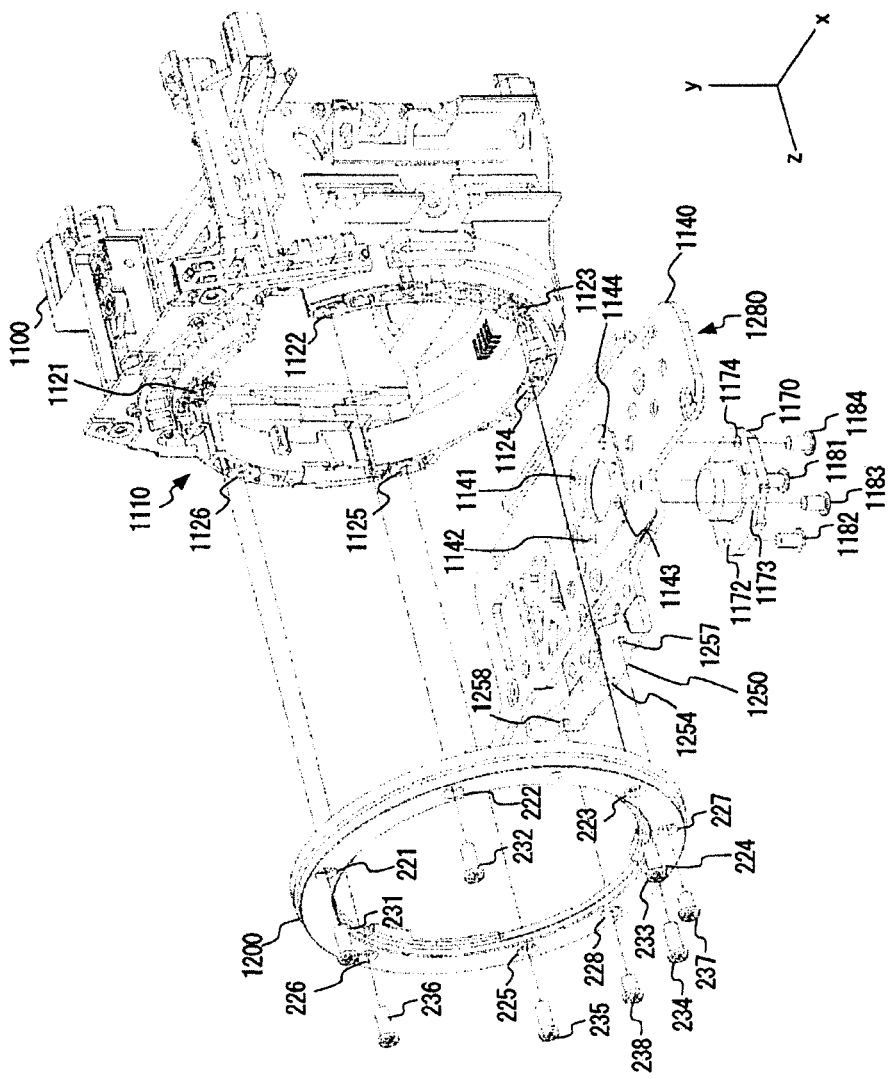
FIG. 12 is an exploded perspective view schematically showing another assembly example of the tripod base assembly.

FIG. 12 is an exploded perspective view schematically showing another assembly example of the tripod base assembly. In the present assembly example, components that are the same as components described in relation to FIG. 11 are given the same reference numerals and descriptions thereof are omitted.

A hole 221, a hole 222, a hole 223, a hole 224, a hole 225, a hole 226, a hole 227, and a hole 228 are formed in the body-side mount 1200. The body-side mount 1200 differs from the body-side mount 200 by including the hole 227 and the hole 228. The remaining structure of the body-side mount 1200 may be the same as the structure of the body-side mount 200. The tripod base attaching member 1280 includes a securing section 1250 and a tripod base attaching portion 1140. A hole 1254, a female thread 1257, and a female thread 1258 are formed in the securing section 1250 of the tripod base attaching member 1280.

The screw 231 is inserted through the hole 221 and the female thread 1121. The screw 232 is inserted through the hole 222 and the female thread 1122. The screw 233 is inserted through the hole 223 and the female thread 1123. The screw 234 is inserted through the hole 224, the hole 1254, and the female thread 1124. The screw 235 is inserted through the hole 225 and the female thread 1125. The screw 236 is inserted through the hole 226 and the female thread 1126.

The screw 237 is inserted through the hole 227 and the female thread 1257. The screw 238 is inserted through the hole 228 and the female thread 1258. In this way, the body-side mount 1200 and the tripod base attaching member 1280 are fastened together by the screw 237 and the screw 238 as well. With this assembly example as well, the stress placed on the tripod base 1170 can be absorbed by the body-side mount 1200 via the tripod base attaching member 1280.

In the imaging device 10 described above, the imaging unit 160 including an imaging element is used as an example of a light receiving unit that receives light passed through an interchangeable lens. The light receiving unit may be a focal point detection unit that includes a sensor for detecting a focal state from a subject. The sensor of the focal point detection unit may be a line sensor that detects a phase difference. The light receiving unit may be a finder unit. The finder unit may include a photometric unit that includes a photometric sensor for measuring the light amount from the subject. The finder unit may have a focus plate.

Among the imaging unit 160, the finder unit, and the focal point detection unit that are examples of the light receiving unit, a light receiving unit that is a combination of one or more of these units may be secured to the body 100.

For example, a single light receiving unit may be secured to the body 100. Specifically, the imaging unit 160 alone may be secured to the body 100. The finder unit alone may be secured to the body 100. The focal point detection unit alone may be secured to the body 100. In any of these cases, the imaging device 10 need not include a light receiving unit other than the light receiving unit secured to the body 100. For example, the imaging device 10 may include just the imaging unit 160 as the light receiving unit, and the imaging unit 160 of the imaging device 10 may be secured to the body 100.

Instead, two or more light receiving units may be secured to the body 100. For example, just the imaging unit 160 and the finder unit may be secured to the body 100. Just the imaging unit 160 and the focal point detection unit may be secured to the body 100. Just the finder unit and the focal point detection unit may be secured to the body 100. In any of these cases, the imaging device 10 need not include a light receiving unit other than the light receiving units secured to the body 100. For example, the imaging device 10 may include just the imaging unit 160 and the finder unit as light receiving units, and have the imaging unit 160 and the finder unit of the imaging device 10 secured to the body 100. The imaging device 10 may include just the imaging unit 160 and the focal point detection unit as the light receiving units, and have the imaging unit 160 and the focal point detection unit of the imaging device 10 secured to the body 100.

The body 100 may have three light receiving units secured thereto. For example, the imaging unit 160, the finder unit, and the focal point detection unit may be secured to the body 100. In this case, the imaging device 10 need not include any light receiving units other than the light receiving units secured to the body 100. For example, the imaging device 10 may include just the imaging unit 160, the finder unit, and the focal point detection unit as the light receiving units, and the imaging unit 160, the finder unit, and the focal point detection unit of the imaging device 10 may be secured to the body 100. In this case, the imaging device 10 may include further light receiving units in addition to the imaging unit 160, the finder unit, and the focal point detection unit. In other words, the imaging device 10 may further include one or more light receiving units that are not secured to the body 100.

In the present embodiment, a camera body that does not include a lens apparatus is provided as an example of the structure of the imaging device. However, the imaging device may include a camera body and a lens unit. In addition to the single-lens reflex camera that is one example of an interchangeable lens camera, the imaging device can be a variety of types of cameras with interchangeable lenses. The imaging device is an example of a light receiving apparatus. The light receiving apparatus is not limited to an imaging device, and may be equipment other than an imaging device.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An imaging device comprising:
   an imaging element;
   a first member to which the imaging element is secured;
   a mount to which an interchangeable lens is detachably mounted, the mount being in a ring shape in a length of the mount in a direction of an optical axis of the imaging device; and
   a second member covering at least a portion of the first member, the first member and the mount each being secured to the second member; and
   a third member connected to the second member and covering at least a portion of the first member in a non-contact manner with the first member,
   wherein an end surface of the mount facing the second member is in a ring shape, and
   at least a part of the end surface abuts a surface of the second member to be secured to the surface, the surface being perpendicular to the direction of the optical axis of the imaging device, and
   wherein the second member forms at least a part of a grip for a user to hold the imaging device.

2. The imaging device according to claim 1, wherein the mount is secured to the surface of the second member using one or more screws, the surface being perpendicular to the direction of the optical axis of the imaging device.

3. The imaging device according to claim 2, wherein the one or more screws are arranged along the mount.

4. The imaging device according to claim 1, wherein the second member covers at least a part of a power supply unit for driving the imaging device.

5. The imaging device according to claim 4, wherein the second member covers at least the part of the power supply unit, the power supply unit being positioned inside the grip.

6. The imaging device according to claim 1, wherein the mount and the second member are secured, in the direction of the optical axis of the imaging device, using a screw at a location where the mount and the second member overlap with each other in the direction of the optical axis.

7. The imaging device according to claim 1, wherein the second member covers at least a portion of a region of the first member, the region extending in the direction of the optical axis.

8. An imaging device comprising:
an imaging element;
a first member to which the imaging element is secured;
a mount to which an interchangeable lens is detachably mounted, the mount being in a ring shape in a length of the mount in a direction of an optical axis of the imaging device; and
a second member forming at least a part of a grip for a user to hold the imaging device, the first member and the mount each being secured to the second member
a third member connected to the second member and covering at least a portion of the first member in a non-contact manner with the first member,
wherein an end surface of the mount facing the second member is in a ring shape, and at least a part of the end surface abuts a surface of the second member to be secured to the surface, the surface being perpendicular to the direction of the optical axis of the imaging device.

* * * * *